United States Patent
Kim et al.

(10) Patent No.: US 9,000,620 B2
(45) Date of Patent: Apr. 7, 2015

(54) APPARATUS AND METHOD OF DIVIDING WIRELESS POWER IN WIRELESS RESONANT POWER TRANSMISSION SYSTEM

(75) Inventors: Ki Young Kim, Yongin-si (KR); Eun Seok Park, Suwon-si (KR); Young Ho Ryu, Yongin-si (KR); Sang Wook Kwon, Seongnam-si (KR); Yun Kwon Park, Dongducheon-si (KR); Young Tack Hong, Seongnam-si (KR); Nam Yun Kim, Seoul (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 13/469,323

(22) Filed: May 11, 2012

(65) Prior Publication Data

US 2012/0306283 A1 Dec. 6, 2012

(30) Foreign Application Priority Data

May 31, 2011 (KR) .................. 10-2011-0051828

(51) Int. Cl.
  *H01F 27/42* (2006.01)
  *H02J 7/02* (2006.01)
  *H02J 17/00* (2006.01)
  *H02J 7/00* (2006.01)

(52) U.S. Cl.
  CPC .............. *H02J 17/00* (2013.01); *H02J 7/0013* (2013.01); *H02J 7/025* (2013.01)

(58) Field of Classification Search
  USPC ........................................ 307/104
  See application file for complete search history.

(56) References Cited

U.S. PATENT DOCUMENTS

| 2009/0146892 A1 | 6/2009 | Shimizu et al. |
| 2011/0049995 A1 | 3/2011 | Hashiguchi |

FOREIGN PATENT DOCUMENTS

| JP | 2010-063245 A | 3/2010 |
| JP | 2010-154592 A | 7/2010 |
| JP | 2010-158151 A | 7/2010 |
| JP | 2010-183812 A | 8/2010 |
| JP | 2010-183813 A | 8/2010 |
| JP | 2010-233354 A | 10/2010 |
| JP | 2011-019291 A | 1/2011 |
| JP | 2011-030293 A | 2/2011 |
| JP | 2011-030317 A | 2/2011 |
| JP | 2011-030422 A | 2/2011 |
| KR | 10-2010-0091112 A | 8/2010 |
| KR | 10-2011-0004321 A | 1/2011 |

*Primary Examiner* — Robert L. Deberadinis
(74) *Attorney, Agent, or Firm* — NSIP Law

(57) ABSTRACT

Provided are methods and apparatuses for distributing wireless power in a wireless power transmission system. According to a general aspect, a source device that distributes a wireless power in a wireless power transmission system may include: a matching circuit searching unit configured to determine information associated with a matching circuit of a source device based on one or more target devices and the amount of power to be distributed to the one or more of the target devices; and a matching circuit modifying unit configured to modify the shape of the matching circuit of the source device to correspond to the determined information associated with the matching circuit of the source device.

25 Claims, 24 Drawing Sheets

1400

APPARATUS AND METHOD OF DIVIDING WIRELESS POWER IN WIRELESS RESONANT POWER TRANSMISSION SYSTEM

CROSS-REFERENCE TO RELATED APPLICATION(S)

This application claims the benefit under 35 U.S.C. §119(a) of Korean Patent Application No. 10-2011-0051828, filed on May 31, 2011, in the Korean Intellectual Property Office, the entire disclosure of which is incorporated herein by reference for all purposes.

BACKGROUND

1. Field

The following description relates wireless power transmission.

2. Description of Related Art

Wireless power refers to energy that is transferred from a wireless power transmitter to a wireless power receiver, for instance, through magnetic coupling or resonance coupling. Accordingly, a conventional wireless power transmission system may include a source device and a target device, where the source device wirelessly transmits power, and the target device wirelessly receives power. The source device may include a source resonator, and the target device may include a target resonator. Magnetic coupling or resonance coupling may be formed between the source resonator and the target resonator. Due to characteristics of a wireless environment, there is a high probability that the distance between the source resonator and the target resonator varies over time. Thus, conditions for matching both resonators may be change.

SUMMARY

According to one general aspect, a source device that distributes a wireless power in a wireless power transmission system may include: a matching circuit searching unit configured to determine information associated with a matching circuit of a source device based on one or more target devices and the amount of power to be distributed to the one or more of the target devices; and a matching circuit modifying unit configured to modify the shape of the matching circuit of the source device to correspond to the determined information associated with the matching circuit of the source device.

The source device may further include: a target determining unit configured to determine the number of target devices, and respective states of the target devices; and a distribution determining unit configured to determine the amount of power to be distributed to the one or more target devices based on the number of target devices and the respective states of the target devices.

The state of the target device may include: a type of a device, an amount of power required, an amount of charged power, or any combination thereof.

The matching circuit searching unit may determine the information associated with the matching circuit using a table including a shape of a matching circuit of the source device, one or more shapes of a target device and one or more amounts of power to be distributed to a target device.

The matching circuit searching unit may determine shapes of matching circuits of target devices that correspond to the number of target devices and the amount of power to be distributed to the one or more target devices, and transmit, to the one or more target devices, information associated with a corresponding shape of a matching circuit.

The target determining unit may determine the number of target devices by receiving requests for supplying of power through communication with the target devices, by utilizing a sensor configured to sense a target device, or based on a resonance characteristic for supplying of the wireless power.

The matching circuit may include a switch or a variable device configured to modify the shape of the matching circuit; and the matching circuit modifying unit may modify the switch or the variable device to correspond to the determined information associated with the matching circuit of the source device.

According to another general aspect, a target device to which a wireless power is distributed in a wireless power transmission system may include: a matching circuit shape receiving unit configured to receive, from a source device, information associated with a shape of a matching circuit of a target device; and a matching circuit modifying unit configured to modify the shape of the matching circuit of the target device to correspond to the received information associated with the shape of the matching circuit of the target device.

The target device may further include: a requesting unit configured to report a state of the target device to the source device.

The requesting unit may request, from the source device, supplying of power.

The state of the target device may include a type of a device, an amount of power required, an amount of charged power, or any combination thereof.

The matching circuit may include a switch or a variable device configured to modify the shape of the matching circuit; and the matching circuit modifying unit may modify the switch or the variable device to correspond to the received information associated with the shape of the matching circuit of the target device.

According to yet another general aspect, a method of distributing a wireless power in a source device in a wireless power transmission system may include: determining a shape of a matching circuit of the source device based on one or more target devices and the amount of power to be distributed to the one or more target devices; and modifying the matching circuit of the source device to correspond to the determined shape of the matching circuit of the source device.

The method may further include: determining the number of target devices; determining the respective states of the target devices; and determining the amount of power to be distributed to the one or more target devices based on the number of target devices and respective states of the one or more target devices.

The state of a target device may include: a type of a device, an amount of power required, an amount of charged power, or any combination thereof.

The determining of the shape of the matching circuit of the source device may include: determining the shape of the matching circuit of the source device based on a table including a shape of the matching circuit of the source device, one or more shapes of matching circuits of a target device and one or more amounts of power to be distributed to a target device.

Before the transmitting of the wireless power, the method may include: determining shapes of matching circuits of target devices corresponding to the number of target devices and the amount of power to be distributed to the one or more target devices; and transmitting, to one or more target devices, information associated with a corresponding shape of a matching circuit.

The determining of the number of target devices may include: determining the number of target devices by receiving requests for supplying of power through communication with the target devices, by utilizing a sensor configured to sense a target device, or based on a resonance characteristic for supplying of the wireless power.

The modifying of the matching circuit may include: modifying the matching circuit of the source device to correspond to the determined shape of the matching circuit of the source device using a switch or a variable device included in the matching circuit of the source device.

According to further general aspect, a method of receiving a distributed wireless power in a target device in a wireless power transmission system may include: receiving information associated with a shape of a matching circuit of a target device from the source device; and modifying the matching circuit of the target device to correspond to the received information associated with the shape of the matching circuit of the target device.

The method may further include: reporting a state of the target device to the source device.

Before the reporting, the method further include: requesting supplying of power from the source device.

The state of the target device may include: a type of a device, an amount of power required, an amount of charged power, or any combination thereof.

The modifying may include: modifying the matching circuit of the target device to correspond to the received information associated with the shape of the matching circuit of the target device, using a switch or a variable device included in the matching circuit of the target device.

The method may further include: receiving wireless power from the source device.

Other features and aspects may be apparent from the following detailed description, the drawings, and the claims.

Figure 1:
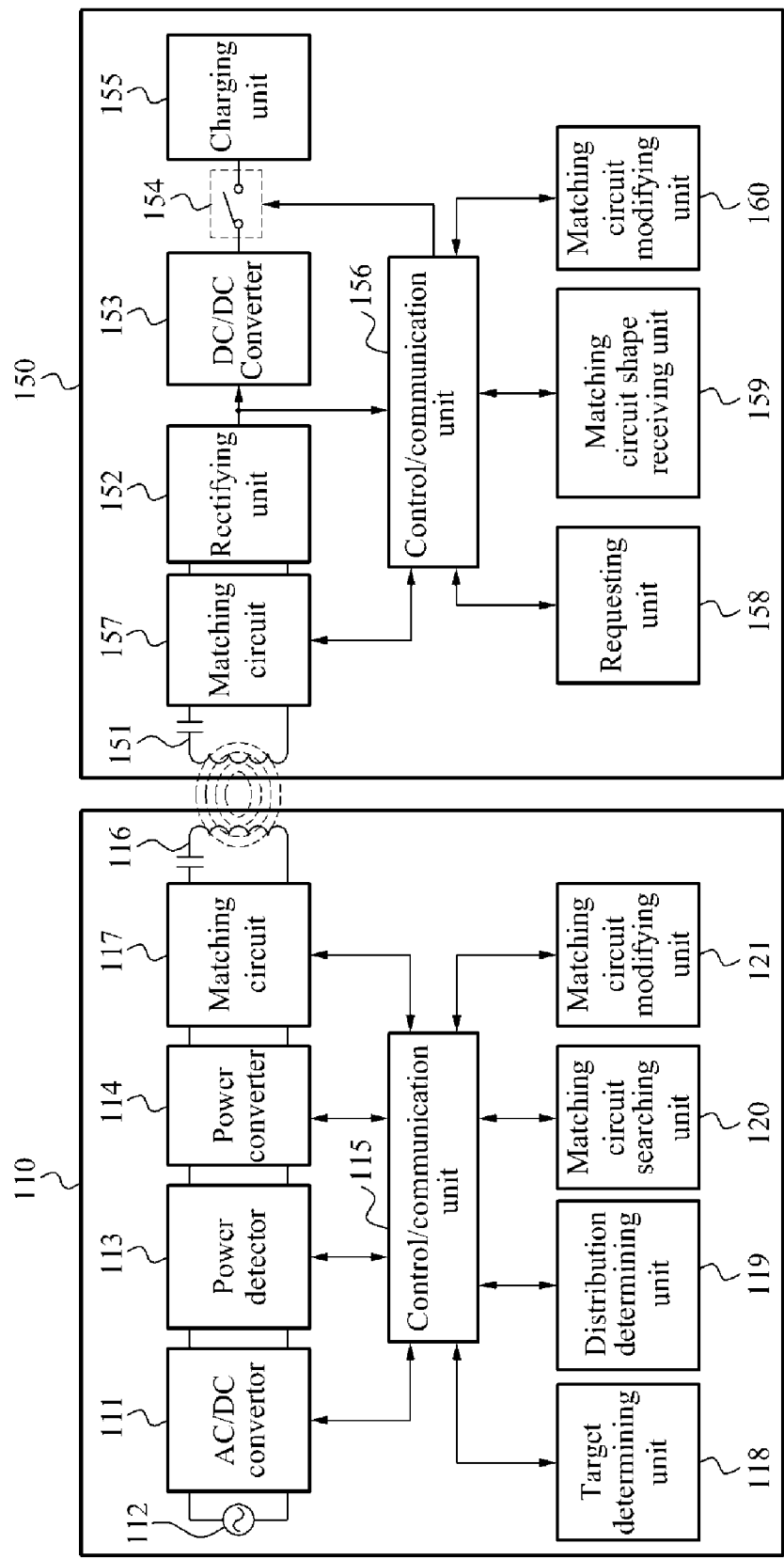
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be apparent or suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

Referring to FIG. 1, the wireless power transmission system includes a source device 110 and a target device 150.

The source device 110 may include an alternating current-to-direct current (AC/DC) converter 111, a power detector 113, a power converter 114, a control and communication (control/communication) unit 115, a source resonator 116, a matching circuit 117, a target determining unit 118, a distribution determining unit 119, a matching circuit searching unit 120, and a matching circuit modifying unit 121.

The target device 150 may include a target resonator 151, a rectifying unit 152, a DC-to-DC (DC/DC) converter 153, a switch unit 154, a charging unit 155, and a control and communication (control/communication) unit 156, a matching circuit 157, a requesting unit 158, a matching circuit shape receiving unit 159, and a matching circuit modifying unit 160.

The AC/DC converter 111 may generate DC voltage by rectifying AC voltage (e.g., in a band of dozens of Hertz (Hz)) output from a power supply 112. The AC/DC converter 111 may output DC voltage of a predetermined level, and/or may adjust an output level of DC voltage based on the control of the control/communication unit 115.

The power detector 113 may detect an output current and an output voltage of the AC/DC converter 111, and may transfer, to the control/communication unit 115, information associated with the detected current and the detected voltage. For instance, the power detector 113 may detect current and/or voltage input to the power converter 114.

The power converter 114 may generate power by converting DC voltage of a predetermined level to AC voltage, for example, using a switching pulse signal in a band of a few megahertz (MHz) to dozens of MHz. The power converter 114 may convert the DC voltage to the AC voltage using a resonance frequency and thus, may generate a communication power to be used for communication, a charging power to be used for charging used in the target device 150, or both. The communication power to be used for communication may correspond to energy for activating a processor and a communication module of the target device 150. Further, the communication power to be used for communication may be referred to as a "wake-up power" in terms of the energy for activating a processor and a communication module of the target device 150. The communication power to be used for communication may be transmitted in a form of a constant wave (CW) during a predetermined time. The charging power to be used for charging may correspond to energy for charging a battery connected to or included in the target device 150. Further, the charging power to be used for charging may be continuously transmitted during a predetermined time, and may be transmitted at a power level greater than the communication power to be used for communication. For example, a power level of the communication power to be used for communication is in a range of 0.1-1 Watt (W) and a power level of the charging power to be used for charging is in a range of 1-20 W.

The source resonator 116 may transfer electromagnetic energy to the target resonator 151. The source resonator 116 may transfer, to the target device 150, a communication power to be used for communication or a charging power to be used for charging through magnetic coupling with the target resonator 151.

The matching circuit 117 may include one or more capacitors, and include a switch, a variable device, or both, configured to modify a shape of a matching circuit based on the control of the matching circuit modifying unit 121. The matching circuit 117 may adjust impedance of a source resonator by turning the switch ON and OFF and by controlling the variable device. The matching circuit 117 may include a Pi matching circuit or a T matching circuit.

The target determining unit 118 may determine the number of target devices to which power is to be supplied, and respective states of the determined target devices. For example, a state of a target device may include a type of a device, an amount of power required, an amount of charged power, or any combination thereof.

The target determining unit 118 may determine the number of target devices by receiving requests for supplying of power from the target devices, by utilizing a sensor that is configured to sense a target device, or based on a resonance characteristic for supplying of a wireless power.

The distribution determining unit 119 may determine the amount of power to be distributed to one or more target devices based on the number of the target devices and the respective states of the target devices. In some instances, the distribution determining unit 119 may distribute more power to one target device than other target devices, as may be necessary.

Figure 2:
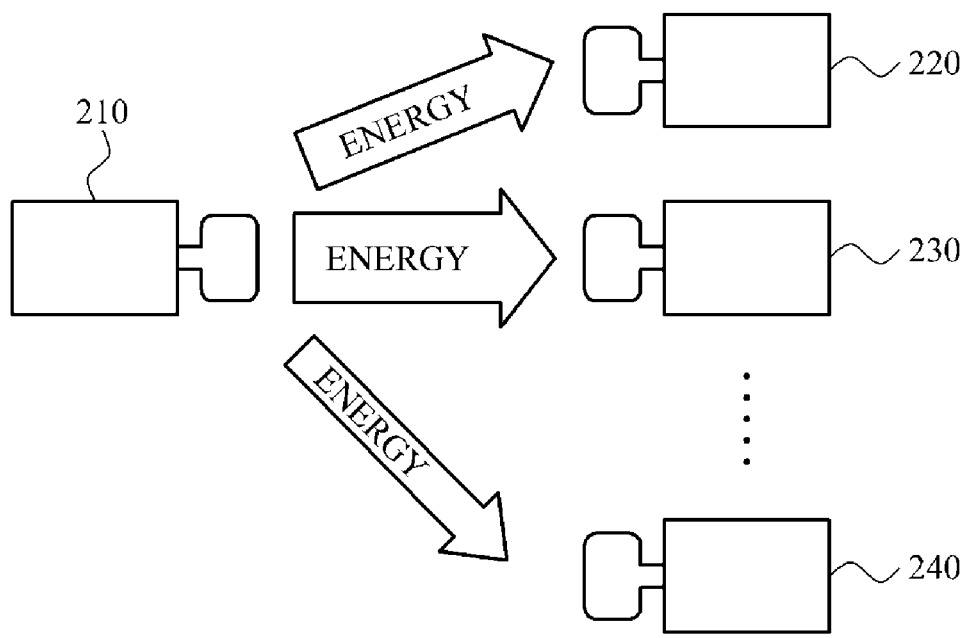
FIG. 2 is a diagram illustrating a source device of a wireless power transmission system which distributes wireless power to a plurality of target devices.

FIG. 2 illustrates a source device of a wireless power transmission system which distributes wireless power to a plurality of target devices.

Referring to FIG. 2, a source device 210 may determine an amount of power to be distributed to target devices 220, 230, and 240. The amount of power to be distributed may be determined based on a number of target devices and respective states of the target devices.

The source device 210 of FIG. 2 may correspond to the source device 110 of FIG. 1, and the target devices 220, 230, and 240 may each correspond to the target device 150.

A matching circuit searching unit 120 may be configured to determine a shape of a matching circuit 117 of the source device 210 that corresponds to the number of target devices and the amount of power to be distributed to each target device of the target devices, and may determine a shape of a matching circuit 157 of one of more of the target devices 220, 230, and 240.

When the matching circuit searching unit 120 determines the shape of the matching circuit 117 of the source device 210 and the shape of the matching circuit 157 of each target device, the matching circuit searching unit 120 may select a shape that enables impedance of a power converter 114 of the source device 210 and the impedance shown from the power converter 114 to be the same or substantially similar to each other. For example, the impedance shown from the power converter 114 may indicate an impedance of a subsequent end of the power converter 114 in a wireless power system.

In some implementations, the matching circuit searching unit 120 may determine the shape of the matching circuit 117 of the source device 210 and the shape of the matching circuit 157 of each target device, based on a table including a shape of a matching circuit of a source device, one or more shapes of matching circuits of target devices corresponding to a number of target devices and amounts of power to be distributed to the target devices.

The matching circuit searching unit 120 may transmit, to one or more of the target devices, information associated with a corresponding shape of a matching circuit.

The matching circuit modifying unit 121 may modify the matching circuit 117 of the source device 210 to correspond to the determined shape of the matching circuit 117 of the source device 210. A matching circuit modifying unit 121 may modify or otherwise alter the matching circuit 117 of the source device to correspond to the determined shape of the matching circuit 117 of the source device 210. For instance, a switch or a variable device may be included in the matching circuit 117 of the source device for this purpose.

A control/communication unit 115 may be configured to control a frequency of a switching pulse signal. The frequency of the switching pulse signal may be determined based on the control of the control/communication unit 115. The control/communication unit 115 may control the power converter 114 so as to generate a modified signal to be transmitted to a target device. For example, the control/communication unit 115 may transmit messages to the target device through in-band communication. Also, the control/communication unit 115 may detect a reflected wave, and may demodulate a signal received from the target device through an envelope of the detected reflected wave.

The control/communication unit 115 may generate the modulated signal for in-band communication, using various schemes. To generate the modulated signal, the control/communication unit 115 may turn a switching pulse signal ON or OFF, or may perform delta-sigma modulation. Additionally, the control/communication unit 115 may generate a pulse-width modulated (PWM) signal having a predetermined envelope.

The control/communication unit 115 may perform out-band communication using a communication channel, as opposed to using a resonance frequency. The control/communication unit 115 may include a communication module, such as one configured to process ZigBee, Bluetooth, Wi-Max, Wi-Fi communications and the like. The control/communication unit 115 may perform transmission and reception of data with a target device, through out-band communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The control/communication unit 115 may perform functions of the target determining unit 118, the distribution determining unit 119, the matching circuit searching unit 120, and the matching circuit modifying unit 121. The control/communication unit 115, the target determining unit 118, the distribution determining unit 119, the matching circuit searching unit 120, and the matching circuit modifying unit 121 are illustrated, separately, so as to describe respective functions of each. Therefore, the control/communication unit 115 may include at least one processor configured to perform respective functions of the target determining unit 118, the distribution determining unit 119, the matching circuit searching unit 120, and the matching circuit modifying unit 121. Also, the control/communication unit 115 may include at least one processor configured to perform at least one of function of the target determining unit 118, the distribution determining unit 119, the matching circuit searching unit 120, and the matching circuit modifying unit 121.

A target resonator 151 may receive electromagnetic energy from a source resonator 116. That is, the target resonator 151 may receive, from the source device 110, the communication power to be used for communication or the charging power to be used for charging through magnetic coupling with the source resonator 116. The target resonator 151 may receive varied messages from the source device 210 through in-band communication.

A rectifying unit 152 may generate DC voltage by rectifying AC voltage received by the target resonator 151.

A DC/DC converter 153 may adjust a level of the DC voltage output from the rectifying unit 152, based on a capacity of the charging unit 155. For example, the DC/DC converter 153 may adjust the level of the DC voltage output from the rectifying unit 152 between 3 and 10 V.

A switch unit 154 may be turned ON and OFF, based on the control of a control/communication unit 156. When the switch unit 154 is turned OFF, the control/communication 115 of the source device 110 may detect a reflected wave. When the switch unit 154 is turned OFF, the magnetic coupling between the source resonator 116 and the target resonator 151 may be eliminated.

A charging unit 155 may include at least one battery. The charging unit 155 may charge the at least one battery using a DC voltage output from the DC/DC converter 153.

The matching circuit 157 may include one or more capacitors or one or more inductors, and may include a switch and/or a variable device configured to modify a shape of a matching circuit based on the control of a matching circuit modifying unit 160. The matching circuit 157 may adjust the impedance of a target resonator based on ON and OFF of the switch and/or the control of the variable device. The matching circuit 157 may include a Pi matching circuit or a T matching circuit.

A requesting unit 158 may request supplying of power from the source device 210, and may report a state of a target device. The state of the target device may include a type of a device, an amount of power required, an amount of charged power, or any combination thereof.

A matching circuit shape receiving unit 159 may receive, from the source device 210, information associated with a shape of a matching circuit of a target device.

The matching circuit modifying unit 160 may modify the matching circuit 157 of a target device to correspond to the received information associated with the shape of the matching circuit 157 of the target device. For example, the matching circuit modifying unit 160 may modify the matching circuit 157 of the target device to correspond to the received information associated with the shape of the matching circuit 157 of the target device, using a switch or a variable device included in the matching circuit 157 of the target device.

The control/communication unit 156 may perform in-band communication for transmitting and receiving data using a resonance frequency. For example, the control/communication unit 156 may demodulate a received signal by detecting a signal between the target resonator 151 and the rectifying unit 152, or by detecting an output signal of the rectifying unit 122. The control/communication unit 156 may demodulate a message received through the in-band communication.

The control/communication unit 156 may adjust an impedance of the target resonator 151 so as to modulate a signal to be transmitted to the source device 110. The control/communication unit 156 may modulate the signal to be transmitted to the source device 210, by turning the switch unit 154 ON and OFF. For example, the control/communication unit 156 may increase the impedance of the target resonator 151 so that a reflected wave may be detected from the control/communication unit 115 of the source device 210. In this example, depending on whether the reflected wave is detected, the control/communication unit 115 may detect a binary value (e.g., "0" or "1").

The control/communication unit 156 may perform outband communication using a communication channel. The control/communication unit 156 may include a communication module, such as one configured to process Zigbee, Bluetooth, Wi-Max, Wi-Fi communications and the like. The control/communication 156 may perform transmission and reception of data with the source device 210.

The control/communication unit 156 may perform functions of the requesting unit 158, the matching circuit shape receiving unit 159, and the matching circuit modifying unit 160. The control/communication unit 156, the requesting unit 158, the matching circuit shape receiving unit 159, and the matching circuit modifying unit 160 are illustrated, separately, so as to describe respective functions of each. Therefore, the control/communication unit 156 may include at least one processor configured to perform respective functions of the requesting unit 158, the matching circuit shape receiving unit 159, and the matching circuit modifying unit 160. Also, the control/communication unit 156 may include at least one processor configured to perform at least one of functions of the requesting unit 158, the matching circuit shape receiving unit 159, and the matching circuit modifying unit 160.

Figure 3:
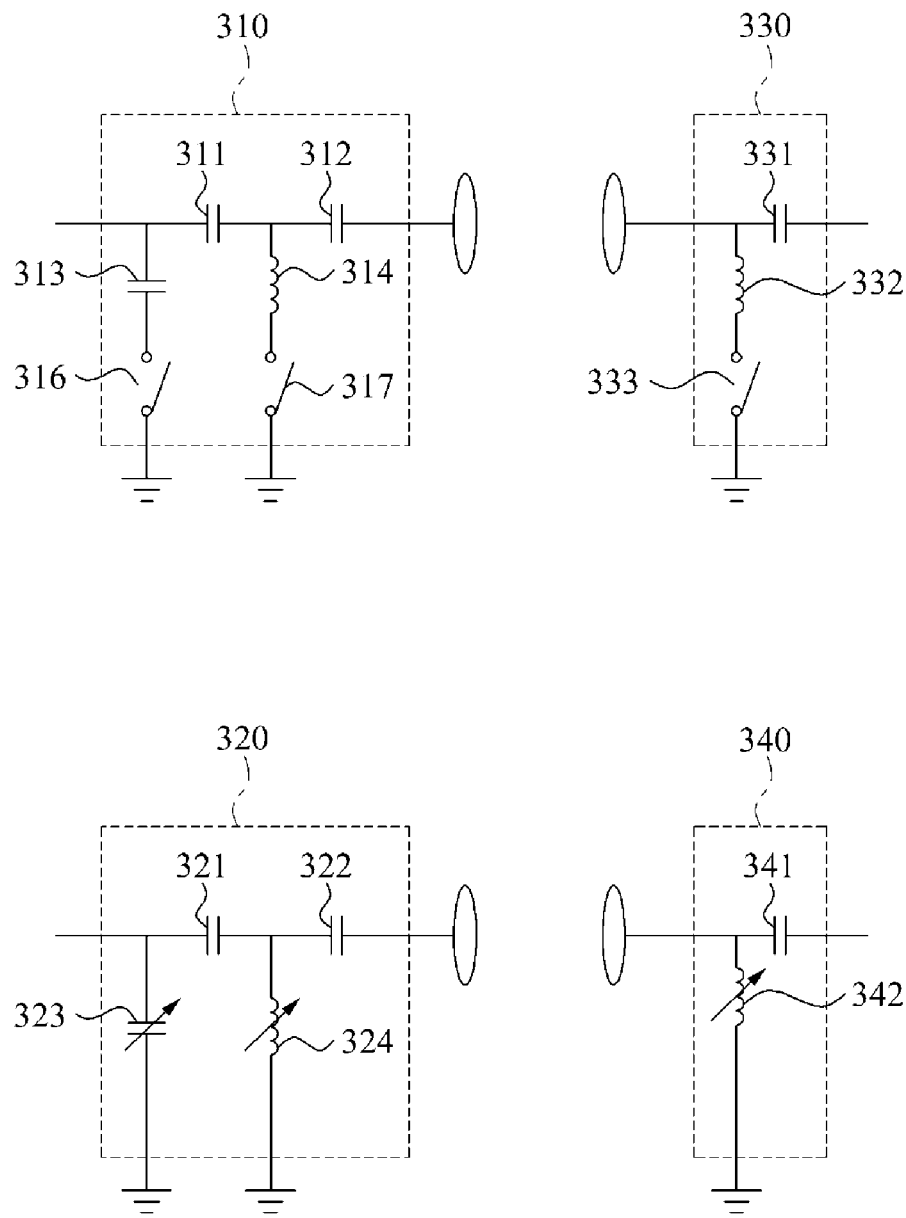
FIG. 3 is a diagram illustrating various configuration of a matching circuit of a source device, and a configuration of a matching circuit of a target device.

FIG. 3 illustrates various configurations of a matching circuit of a source device, and examples of a configuration of a matching circuit of a target device.

Referring to FIG. 3, the matching circuits 310 and 320 may be the matching circuit of the source device.

The matching circuit 310 may be configured to include two capacitors 311 and 312 connected with a source resonator in series, and a capacitor 313 and an inductor 314, which are connected in parallel. The capacitor 313 and the inductor 314 are controlled by turning switches 316 and 317 ON and OFF. The matching circuit 310 may control the impedance by turning switches 316 and 317 ON and OFF. For example, when a single target device is used, both the switches 316 and 317 are turned OFF and when two target devices are used, both the switches 316 and 317 are turned ON.

The matching circuit 320 may be configured to include two capacitors 321 and 322 connected with the source resonator in series, and a variable capacitor 323 and a variable inductor 324 which are connected in parallel. For example, the matching circuit 320 may control the impedance by varying the variable capacitor 323 and the variable inductor 324.

The matching circuits 330 and 340 may be the matching circuit of the target device, for example.

The matching circuit 330 may be configured to include a capacitor 331 connected with a source resonator in series, and an inductor 332 that is connected with the capacitor 331 in parallel and controlled by turning a switch 333 ON and OFF.

The matching circuit 330 may control impedance by turning the switch 333 ON and OFF. For example, when a single target device that receives power from the source device is used, the switch 333 may be turned OFF. When two target devices are used, the switch 333 may be turned ON.

The matching circuit 340 may be configured to include a capacitor 341 connected with a source resonator in series, and a variable inductor 342 connected, in parallel, with the capacitor 341. The matching circuit 340 may control impedance by varying the variable inductor 342.

Figure 4:
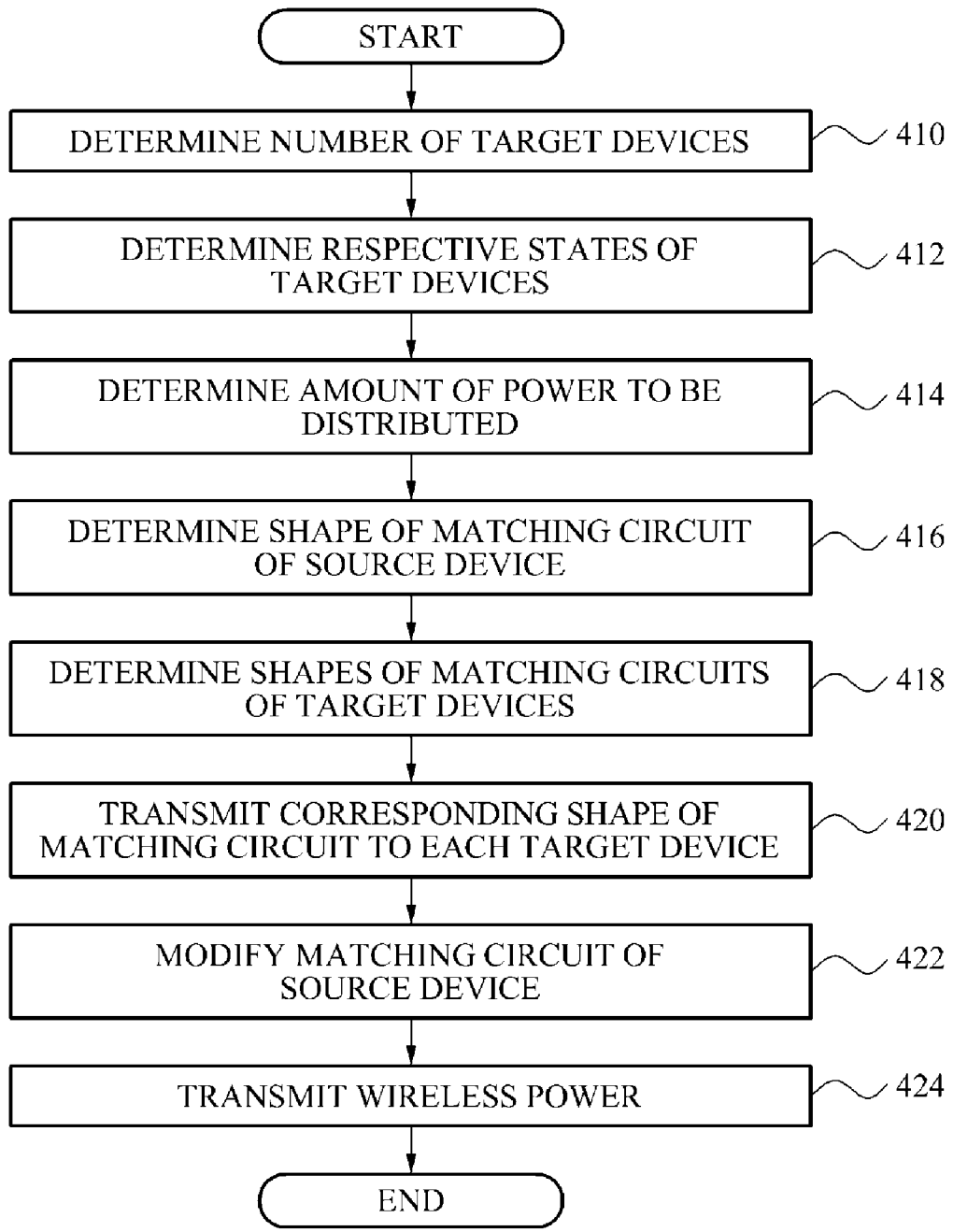
FIG. 4 is a flowchart illustrating a method of distributing wireless power in a source device of a wireless power transmission system.

FIG. 4 illustrates a method of distributing a wireless power in a source device of a wireless power transmission system.

In operation 410, the source device may determine a number of target devices.

In operation 412, the source device may determine respective states of the determined target devices. For example, the state of the target device may be at least one of a type of a device, an amount of power required, and an amount of charged power.

In operation 414, the source device may determine an amount of power to be distributed to one or more target devices based on the number of the target devices and the respective states of the target devices.

In operation 416, the source device may determine a shape of a matching circuit of the source device corresponding to the number of target devices and the amount of power to be distributed to each target device. In operation 418, the source device may determine shapes of matching circuits of target devices corresponding to the number of target devices and the amount of power to be distributed to one or more target devices. For example, the source device may determine the shapes of the matching circuits of the source device and the target devices based on a table including a shape of the matching circuit of the source device and shapes of matching circuits of the target devices corresponding to a number of target devices and an amount of power to be distributed to each target device, in each instance.

In operation 420, the source device may transmit information associated with a corresponding shape of a matching circuit to each target device.

In operation 422, the source device may modify the matching circuit of the source device to correspond to the determined shape of the matching circuit of the source device. For example, the source device may modify the matching circuit of the source device to correspond to the determined shape of the matching circuit of the source device using a switch or a variable device included in the matching circuit of the source device.

In operation 424, the source device may transmit a distributed wireless power to each target device.

Figure 5:
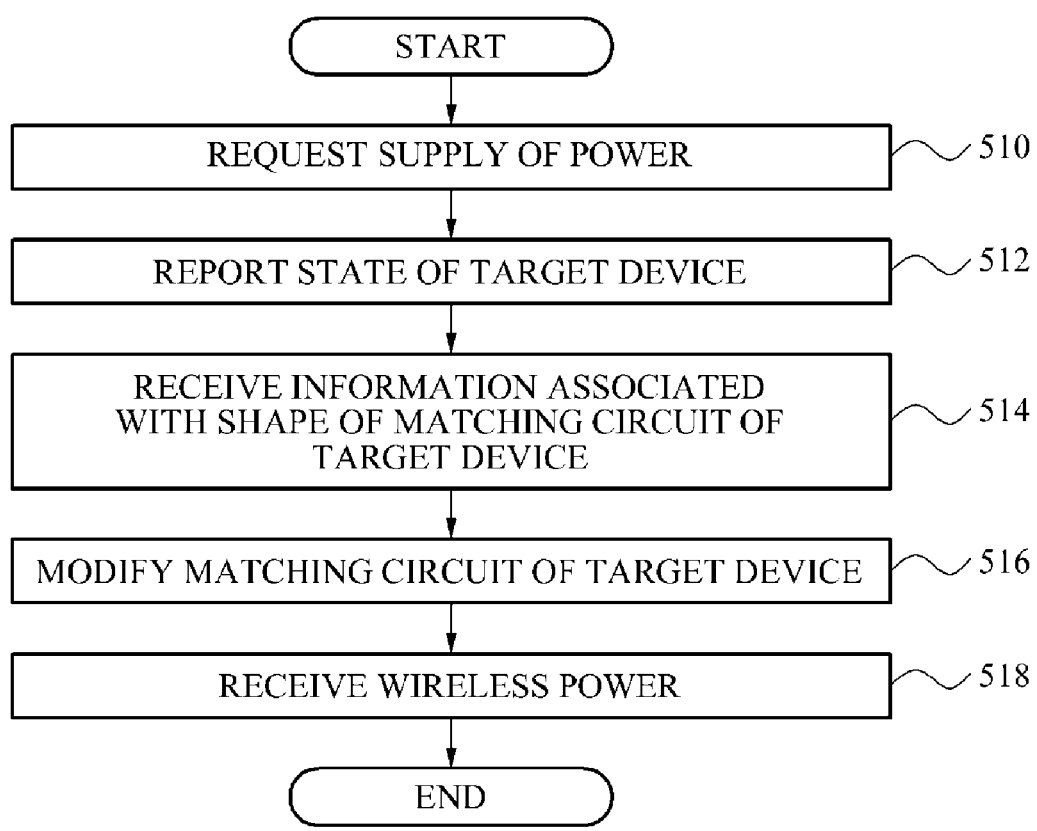
FIG. 5 is a flowchart illustrating a method of receiving wireless power in a target device of a wireless power transmission system.

FIG. 5 illustrates a method of receiving wireless power in a target device of a wireless power transmission system.

In operation 510, the target device may request supplying of power from a source device.

In operation 512, the target device reports a state of the target device to the source device. In various instances, the state of the target device may be a type of a device, an amount of power required, and/or an amount of charged power.

In operation 514, the target device may receive information associated with a shape of a matching circuit of the target device, from the source device.

In operation 516, the target device may modify the matching circuit of the target device to correspond to the received information associated with the shape of the matching circuit of the target device. For example, the target device may modify the matching circuit of the target device to correspond to the received information associated with the shape of the matching circuit of the target device, using a switch or a variable device included in the matching circuit of the target device.

In operation 518, the target device may receive, from the source device, distributed wireless power.

Figure 6A:
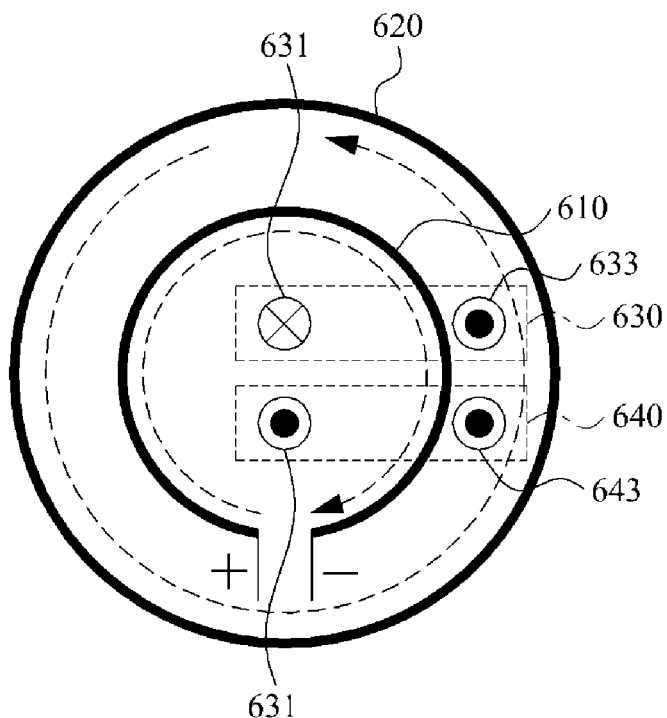
FIGS. 6A and 6B are diagrams illustrating a distribution of a magnetic field in a source resonator and a feeder.
Figure 6B:
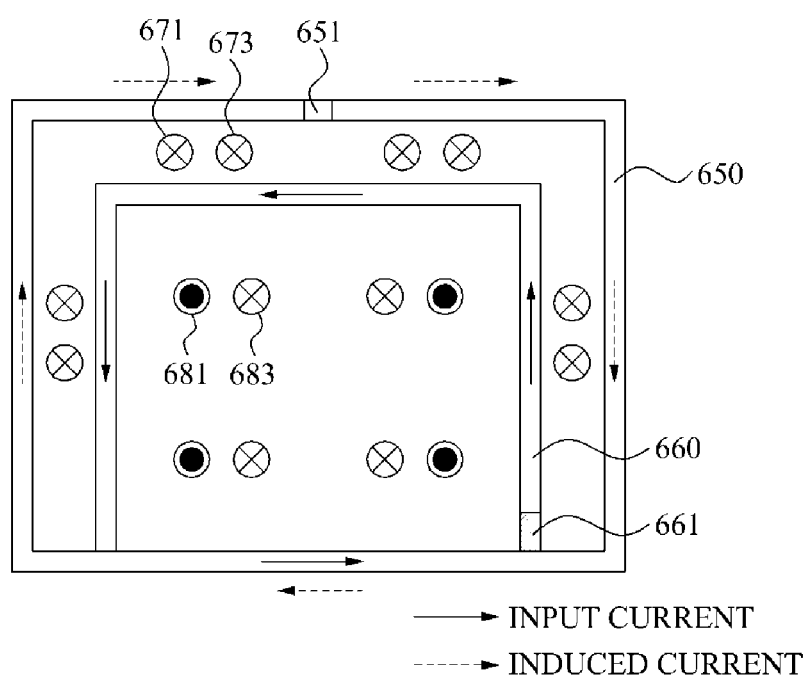

FIGS. 6A and 6B illustrate distribution of a magnetic field in a feeder and a source resonator.

When a source resonator receives power supply through a separate feeder, magnetic fields may be formed in both the feeder and the source resonator.

Referring to FIG. 6A, as input current flows in a feeder 610, a magnetic field 630 may be formed. A direction 631 of the magnetic field 630 within the feeder 610 may have a phase opposite to a phase of a direction 633 of the magnetic field 630 outside the feeder 610. The magnetic field 630 formed by the feeder 610 may cause an induced current to be formed in a source resonator 620. The direction of the induced current may be opposite to a direction of the input current.

Due to the induced current, a magnetic field 640 may be formed in the source resonator 620. Directions of a magnetic field formed due to an induced current in all positions of the source resonator 620 may be identical. Accordingly, a direction 641 of the magnetic field 640 formed by the source resonator 620 may have the same phase as a direction 643 of the magnetic field 640 formed by the source resonator 620.

Consequently, when the magnetic field 630 formed by the feeder 610 and the magnetic field 640 formed by the source resonator 620 are combined, the strength of the total magnetic field may decrease within the feeder 610, but may increase outside the feeder 610. When power is supplied to the source resonator 620 through the feeder 610 configured as illustrated in FIG. 6A, the strength of the total magnetic field may decrease in the center of the source resonator 620, but may increase outside the source resonator 620. When a magnetic field is randomly distributed in the source resonator 620, it may be difficult to perform impedance matching, since an input impedance may frequently vary. Additionally, when the strength of the total magnetic field is increased, the efficiency of wireless power transmission may be increased. Conversely, when the strength of the total magnetic field is decreased, the efficiency for wireless power transmission may be reduced. Accordingly, the power transmission efficiency may be reduced on average.

FIG. 6A illustrates the magnetic field distribution in one target resonator. Current flowing in the source resonator 620 may be induced by the input current flowing in the feeder 610. And current flowing in the target resonator may be induced by a magnetic coupling between the source resonator 620 and the target resonator. The current flowing in the target resonator may cause a magnetic field to be formed, so that an induced current may be generated in a feeder located in the target resonator. Within the feeder, a direction of a magnetic field formed by the target resonator may have a phase opposite to a phase of a direction of a magnetic field formed by the feeder and accordingly, the strength of the total magnetic field may be reduced.

FIG. 6B illustrates one wireless power transmitter in which a source resonator 650 and a feeder 660 have a common ground. The source resonator 650 may include a capacitor 651. The feeder 660 may receive an input of a radio frequency (RF) signal via a port 661.

For example, when the RF signal is received to the feeder 660, an input current may be generated in the feeder 660. The input current flowing in the feeder 660 may cause a magnetic field to be formed, and current may be induced in the source resonator 650 by the magnetic field. Additionally, another magnetic field may be formed due to the induced current flowing in the source resonator 650. A direction of the input current flowing in the feeder 660 may have a phase opposite to a phase of a direction of the induced current flowing in the source resonator 650. Accordingly, in a region between the source resonator 650 and the feeder 660, a direction 671 of the magnetic field formed due to the input current may have the same phase as a direction 673 of the magnetic field formed due to the induced current, and thus the strength of the total magnetic field may increase. Conversely, within the feeder 660, a direction 681 of the magnetic field formed due to the input current may have a phase opposite to a phase of a direction 683 of the magnetic field formed due to the induced current, and thus the strength of the total magnetic field may decrease. Therefore, the strength of the total magnetic field may decrease in the center of the source resonator 650, but may increase outside the source resonator 650.

The feeder 660 may determine an input impedance by adjusting an internal area of the feeder 660. The input impedance refers to an impedance viewed in a direction from the feeder 660 to the source resonator 650. When the internal area of the feeder 660 is increased, the input impedance may be increased. Conversely, when the internal area of the feeder 660 is reduced, the input impedance may be reduced. Since the magnetic field may be randomly distributed in the source resonator 650, despite a reduction in the input impedance, a value of the input impedance may vary depending on a location of a target device. Accordingly, a separate matching network may be required to match the input impedance to an output impedance of a power amplifier. For example, when the input impedance is increased, a separate matching network may be used to match the increased input impedance to a relatively low output impedance in some instances.

If the target resonator has the same configuration as the source resonator 650, and when a feeder of the target resonator has the same configuration as the feeder 660, a separate matching network may be required, because the direction of the current flowing in the target resonator has a phase opposite to the phase of induced current flowing in a direction in the feeder of the target resonator.

Figure 7A:
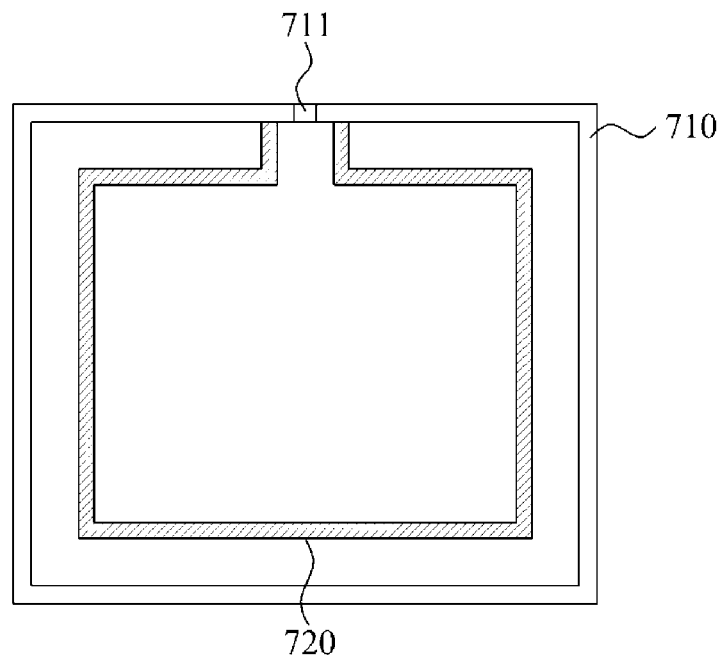
FIGS. 7A and 7B are diagrams illustrating a wireless power transmitter.

FIG. 7A illustrates a wireless power transmitter.

Referring to FIG. 7A, the wireless power transmitter may include a source resonator 710, and a feeding unit 720. The source resonator 710 may include a capacitor 711. The feeding unit 720 may be electrically connected to both ends of the capacitor 711.

Figure 7B:
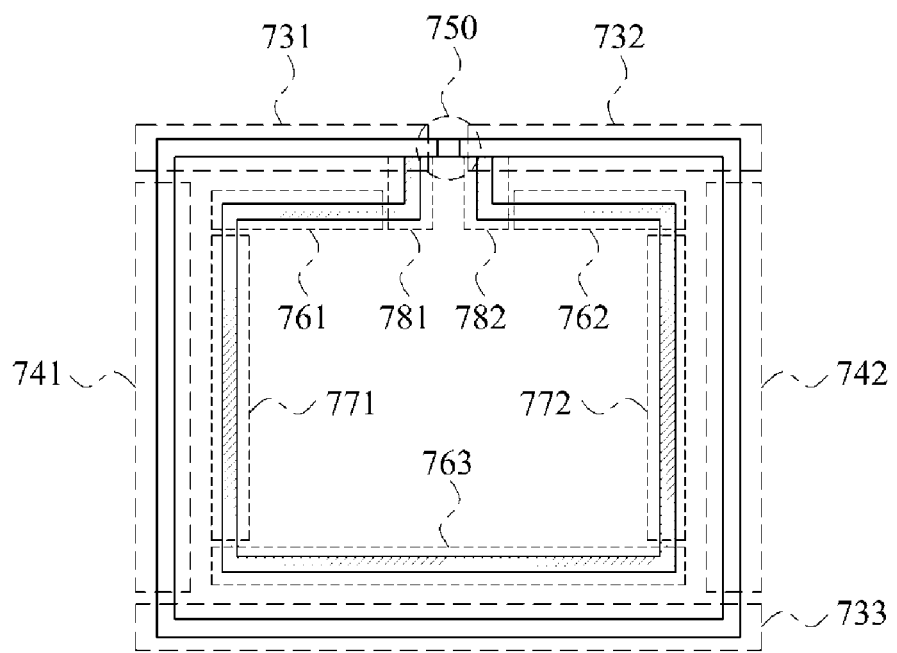

FIG. 7B illustrates, in more detail, the structure of the wireless power transmitter of FIG. 7A. The source resonator 710 may include a first transmission line, a first conductor 741, a second conductor 742, and at least one first capacitor 750.

The first capacitor 750 may be inserted or otherwise positioned in series between a first signal conducting portion 731 and a second signal conducting portion 732 in the first transmission line, and an electric field may be confined within the first capacitor 750. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into and thereby be referred to as the first signal conducting portion 731 and the second signal conducting portion 732. A conductor disposed in a lower portion of the first transmission line may be referred to as a first ground conducting portion 733.

As illustrate in FIG. 7B, the source resonator 710 may have a generally two-dimensional (2D) structure. The first transmission line may include the first signal conducting portion 731 and the second signal conducting portion 732 in the upper portion of the first transmission line. In addition, the first transmission line may include the first ground conducting portion 733 in the lower portion of the first transmission line. The first signal conducting portion 731 and the second signal conducting portion 732 may be disposed to face the first ground conducting portion 733. Current may flow through the first signal conducting portion 731 and the second signal conducting portion 732.

Additionally, one end of the first signal conducting portion 731 may be electrically connected (i.e., shorted) to the first conductor 741, and another end of the first signal conducting portion 731 may be connected to the first capacitor 750. One end of the second signal conducting portion 732 may be shorted to the second conductor 742, and another end of the second signal conducting portion 732 may be connected to the first capacitor 750. Accordingly, the first signal conducting portion 731, the second signal conducting portion 732, the first ground conducting portion 733, and the conductors 741 and 742 may be connected to each other, so that the source resonator 710 may have an electrically closed-loop structure. The term "closed-loop structure" as used herein, may include a polygonal structure, such as, for example, a circular structure, a rectangular structure, or the like that is an electrically closed circuit. The first capacitor 750 may be inserted into an intermediate portion of the first transmission line. For example, the first capacitor 750 may be inserted into a space between the first signal conducting portion 731 and the second signal conducting portion 732. The first capacitor 750 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 750 is instead into the first transmission line, the source resonator 710 may have a characteristic of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on the sign of the corresponding permittivity or magnetic permeability.

When the capacitance of the first capacitor 750 inserted as the lumped element is appropriately determined, the source resonator 710 may have the characteristic of the metamaterial. The source resonator 710 may have a negative magnetic permeability by appropriately adjusting the capacitance of the first capacitor 750. If so, the source resonator 710 may also be referred to as an MNG resonator. Various criteria may be applied to determine the capacitance of the first capacitor 750. For example, the various criteria for enabling the source resonator 710 to have the characteristic of the metamaterial may include one or more of the following: a criterion for enabling the source resonator 710 to have a negative magnetic permeability in a target frequency, a criterion for enabling the source resonator 710 to have a zeroth order resonance characteristic in the target frequency, and/or the like. Based on at least one criterion among the aforementioned criteria, the capacitance of the first capacitor 750 may be determined.

The source resonator 710, also referred to as the MNG resonator 710, may have a zeroth order resonance characteristic of having, as a resonance frequency, a frequency when a propagation constant is "0". Because the source resonator 710 may have a zeroth order resonance characteristic, the resonance frequency may be independent with respect to a physical size of the MNG resonator 710. Moreover, by appropriately designing the first capacitor 750, the MNG resonator 710 may sufficiently change the resonance frequency without substantially changing the physical size of the MNG resonator 710.

In a near field, for instance, the electric field may be concentrated on the first capacitor 750 inserted into the first transmission line. Accordingly, due to the first capacitor 750, the magnetic field may become dominant in the near field. In one or more embodiments, the MNG resonator 710 may have a relatively high Q-factor using the first capacitor 750 of the lumped element. Thus, it may be possible to enhance the power transmission efficiency. For example, the Q-factor may indicate a level of an ohmic loss or a ratio of a reactance with respect to a resistance in the wireless power transmission. The efficiency of the wireless power transmission may increase according to an increase in the Q-factor.

In one or more embodiments, a magnetic core may be further provided to pass through the MNG resonator 710. The magnetic core may increase the power transmission distance.

Referring to FIG. 7B, the feeding unit 720 may include a second transmission line, a third conductor 771, a fourth conductor 772, a fifth conductor 781, and a sixth conductor 782.

The second transmission line may include a third signal conducting portion 761 and a fourth signal conducting portion 762 in an upper portion of the second transmission line. In addition, the second transmission line may include a second ground conducting portion 763 in a lower portion of the second transmission line. The third signal conducting portion 761 and the fourth signal conducting portion 762 may be disposed to face the second ground conducting portion 763. Current may flow through the third signal conducting portion 761 and the fourth signal conducting portion 762.

Additionally, one end of the third signal conducting portion 761 may be electrically connected (i.e., shorted) to the third conductor 771, and another end of the third signal conducting portion 761 may be connected to the fifth conductor 781. One end of the fourth signal conducting portion 762 may be shorted to the fourth conductor 772, and another end of the fourth signal conducting portion 762 may be connected to the sixth conductor 782. The fifth conductor 781 may be connected to the first signal conducting portion 731, and the sixth conductor 782 may be connected to the second signal conducting portion 732. The fifth conductor 781 and the sixth conductor 782 may be connected in parallel to both ends of the first capacitor 750. And the fifth conductor 781 and the sixth conductor 782 may be used as input ports to receive an input of an RF signal.

Accordingly, the third signal conducting portion 761, the fourth signal conducting portion 762, the second ground conducting portion 763, the third conductor 771, the fourth conductor 772, the fifth conductor 781, the sixth conductor 782, and the source resonator 710 may be connected to each other, so that the source resonator 710 and the feeding unit 720 may have an electrically closed-loop structure. When an RF signal is received via the fifth conductor 781 or the sixth conductor 782, an input current may flow in the feeding unit 720 and the source resonator 710, a magnetic field may be formed due to the input current, and a current may be induced to the source resonator 710 by the formed magnetic field. A direction of the input current flowing in the feeding unit 720 may be identical to a direction of the induced current flowing in the source resonator 710 and thus, strength of the total magnetic field may increase in the center of the source resonator 710, but may decrease outside the source resonator 710. The direction of the input current, and the direction of the induced current will be further described with reference to FIGS. 8A and 8B.

An input impedance may be determined based on an area of a region between the source resonator 710 and the feeding unit 720 and accordingly, a separate matching network used to match the input impedance to an output impedance of a power amplifier may not be required. For example, if the matching network is used, the input impedance may be determined by adjusting a size of the feeding unit 720 and thus, a structure of the matching network may be simplified. The simplified structure of the matching network may minimize a matching loss of the matching network.

The second transmission line, the third conductor 771, the fourth conductor 772, the fifth conductor 781, and the sixth conductor 782 may form the same structure as the source resonator 710. For example, if the source resonator 710 has a loop structure, the feeding unit 720 may also have a loop structure. Alternatively, if the source resonator 710 has a circular structure, the feeding unit 720 may also have a circular structure.

The above-described configuration of the source resonator 710 and configuration of the feeding unit 720 may equally be applied to the target resonator and the feeding unit of the target resonator, respectively. When the feeding unit of the target resonator is configured as to described above, the feeding unit may match an output impedance of the target resonator and an input impedance of the feeding unit, by adjusting a size of the feeding unit. Accordingly, a separate matching network may not be needed.

Figure 8A:
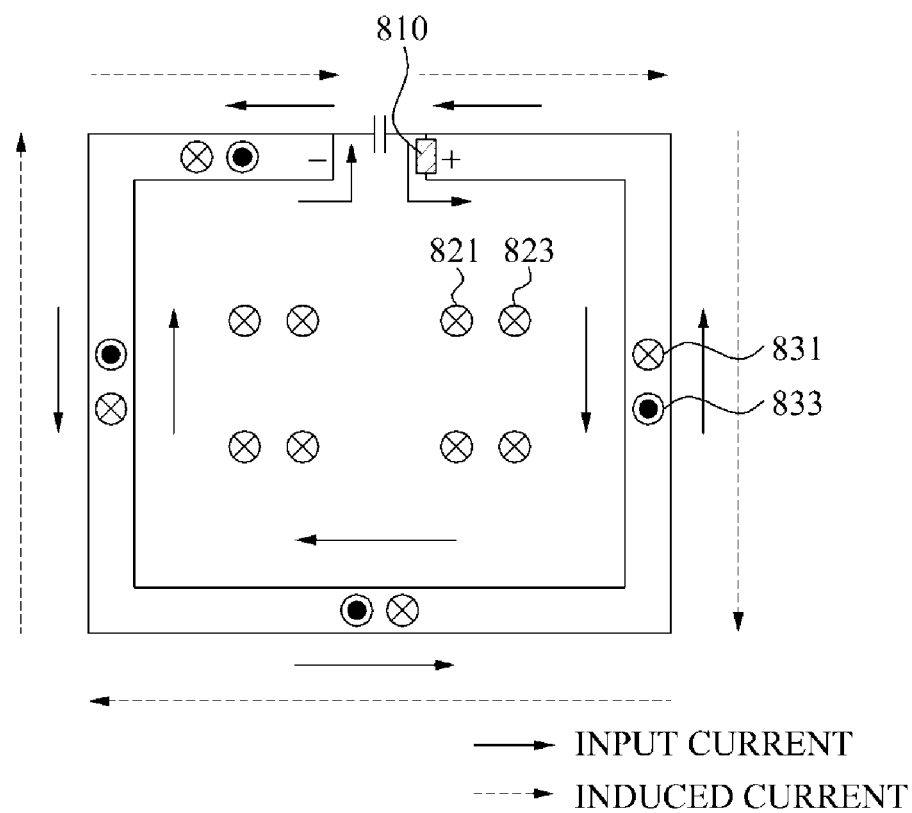
FIG. 8A is a diagram illustrating a distribution of a magnetic field within a source resonator based on feeding of a feeding unit.
Figure 8B:
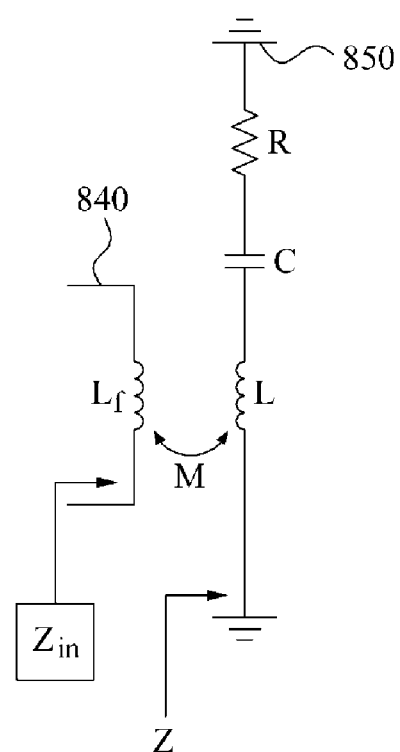
FIG. 8B is a diagram illustrating an equivalent circuit of a feeding unit and a source resonator.

FIG. 8A illustrates a distribution of a magnetic field within a source resonator based on feeding of a feeding unit. Specifically, FIG. 8A illustrates, in more detail, the source resonator 710 and the feeding unit 720 of FIG. 7A. And FIG. 8B illustrates an equivalent circuit of a feeding unit 840, and one equivalent circuit of a source resonator 850.

A feeding operation may refer to supplying a power to a source resonator in a wireless power transmitter, or refer to supplying AC power to a rectification unit in a wireless power receiver. FIG. 8A illustrates a direction of an input current flowing in the feeding unit, and a direction of an induced current induced in the source resonator. Additionally, FIG. 8A illustrates a direction of a magnetic field formed due to the input current of the feeding unit, and a direction of a magnetic field formed due to the induced current of the source resonator.

Referring to FIG. 8A, a fifth conductor or a sixth conductor of the feeding unit may be used as an input port 810. The input port 810 may receive an input of an RF signal. The RF signal may be output from a power amplifier. The power amplifier may increase or decrease the amplitude of the RF signal, on demand by a target device. The RF signal received by the input port 810 may be displayed in the form of an input current flowing in the feeding unit. The input current may flow in a clockwise direction in the feeding unit, along a transmission line of the feeding unit. The fifth conductor of the feeding unit may be electrically connected to the source resonator. And, the fifth conductor may be connected to a first signal conducting portion of the source resonator. Accordingly, the input current may flow in the source resonator, as well as, in the feeding unit. The input current may flow in a counterclockwise direction in the source resonator. The input current flowing in the source resonator may cause a magnetic field to be formed, so that an induced current may be generated in the source resonator due to the magnetic field. The induced current may flow in a clockwise direction in the source resonator. The induced current may transfer energy to a capacitor of the source resonator, and a magnetic field may be formed due to the induced current. The input current flowing in the feeding unit and the source resonator may be indicated by a solid line of FIG. 8A, and the induced current flowing in the source resonator may be indicated by a dotted line of FIG. 8A.

A direction of a magnetic field formed due to a current may be determined based on the right hand rule. As illustrated in FIG. 8A, within the feeding unit, a direction 821 of a magnetic field formed due to the input current flowing in the feeding unit may be identical to a direction 823 of a magnetic field formed due to the induced current flowing in the source resonator. Accordingly, the strength of the total magnetic field may increase within the feeding unit.

Additionally, in a region between the feeding unit and the source resonator, a direction 833 of a magnetic field formed due to the input current flowing in the feeding unit has a phase opposite to a phase of a direction 831 of a magnetic field formed due to the induced current flowing in the source resonator, as illustrated in FIG. 8A. Accordingly, the strength of the total magnetic field may decrease in the region between the feeding unit and the source resonator.

Typically, the strength of the magnetic field decreases in the center of a source resonator having the loop structure, and increases outside the source resonator. However, referring to FIG. 8A, the feeding unit may be electrically connected to both ends of a capacitor of the source resonator, and accordingly the induced current of the source resonator may flow in the same direction as the input current of the feeding unit. Since the induced current of the source resonator flows in the same direction as the input current of the feeding unit, the strength of the total magnetic field may increase within the feeding unit, and may decrease outside the feeding unit. As a result, the strength of the total magnetic field may increase in the center of the source resonator with the loop structure, and may decrease outside the source resonator, due to the feeding unit. Thus, the strength of the total magnetic field may be equalized within the source resonator. Additionally, the power transmission efficiency for transferring power from the source resonator to a target resonator may be in proportion to the strength of the total magnetic field formed in the source resonator. For example, when the strength of the total magnetic field increases in the center of the source resonator, the power transmission efficiency may also increase.

Referring to FIG. 8B, the feeding unit 840 and the source resonator 850 may be expressed by the equivalent circuits. An input impedance $Z_{in}$ viewed in a direction from the feeding unit 840 to the source resonator 850 may be computed, as given in Equation 1.

$$Z_{in} = \frac{(\omega M)^2}{Z} \quad \text{[Equation 1]}$$

In Equation 1, M denotes a mutual inductance between the feeding unit 840 and the source resonator 850, to denotes a resonance frequency between the feeding unit 840 and the source resonator 850, and Z denotes an impedance viewed in a direction from the source resonator 850 to a target device. The input impedance $Z_{in}$ may be in proportion to the mutual inductance M. Accordingly, the input impedance $Z_{in}$ may be controlled by adjusting the mutual inductance M. The mutual inductance M may be adjusted based on an area of a region between the feeding unit 840 and the source resonator 850. The area of the region between the feeding unit 840 and the source resonator 850 may be adjusted based on the size of the feeding unit 840. The input impedance $Z_{in}$ may be determined based on the size of the feeding unit 840, and thus a separate matching network may not be required to perform impedance matching with an output impedance of a power amplifier.

For a target resonator and a feeding unit included in a wireless power receiver, a magnetic field may be distributed as illustrated in FIG. 8A. For example, the target resonator may receive a wireless power from a source resonator, using magnetic coupling. Due to the received wireless power, an induced current may be generated in the target resonator. A magnetic field formed due to the induced current in the target resonator may cause another induced current to be generated in the feeding unit. If the target resonator is connected to the feeding unit as illustrated in FIG. 8A, the induced current generated in the target resonator may flow in the same direction as the induced current generated in the feeding unit. Thus, the strength of the total magnetic field may increase within the feeding unit, but may decrease in a region between the feeding unit and the target resonator.

Figure 9:
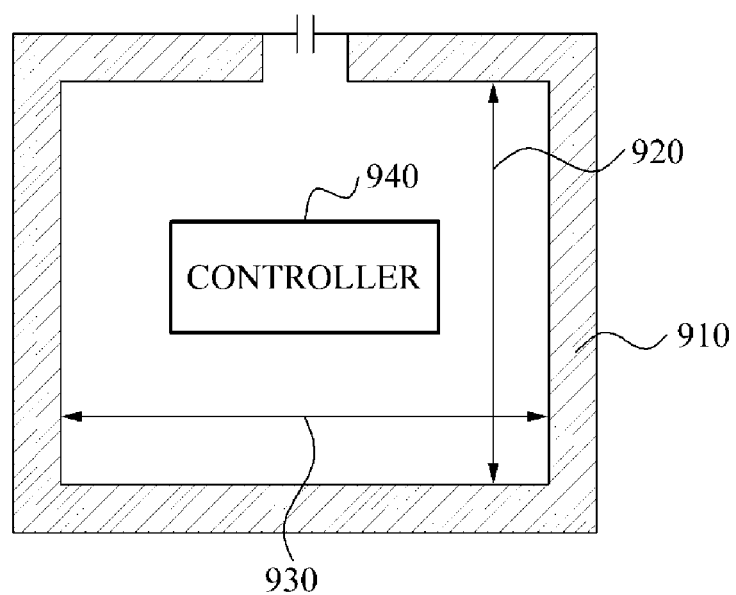
FIG. 9 is a diagram illustrating another wireless power transmitter.

FIG. 9 illustrates another wireless power transmitter.

Referring to FIG. 9, a controller 940 may adjust a mutual inductance M between the feeding unit and the source resonator, by adjusting an area of a region 910 between a feeding unit and a source resonator. By adjusting the mutual inductance M, the controller 940 may determine the value of an input impedance $Z_{in}$. The area of the region 910 may be adjusted by controlling the size of the feeding unit, which may be determined based on a distance 920 between a fourth signal conducting portion and a second ground conducting portion, and/or based on a distance 930 between a third conductor and a fourth conductor.

When the area of the region 910 is increased, the mutual inductance M may be increased. Conversely, when area of the region 910 is reduced, the mutual inductance M may be reduced. The controller 940 may determine the value of the input impedance $Z_{in}$, by adjusting the size of the feeding unit. For example, the value of the input impedance $Z_{in}$ may be adjusted from about 1 ohm (Ω) to 3000Ω, based on the size of the feeding unit. Accordingly, the controller 940 may match the input impedance $Z_{in}$ to an output impedance of a power amplifier, based on the size of the feeding unit. The controller 940 may not need to employ a separate matching network to perform impedance matching between the input impedance $Z_{in}$ and the output impedance of the power amplifier. For example, when the output impedance of the power amplifier has a value of 50Ω, the controller 940 may adjust the input impedance $Z_{in}$ to 50Ω, by adjusting the size of the feeding unit. Additionally, if a matching network is used for an efficiency of matching, the controller 940 may minimize the loss of the power transmission efficiency by simplifying a structure of the matching network.

The controller 940 may control the magnetic field formed in the source resonator to be uniformly distributed, based on a direction of an induced current flowing in the source resonator, and a direction of an input current flowing in the feeding unit. Since the feeding unit and the source resonator are electrically connected to both ends of a capacitor, the induced current may flow in the source resonator in the same direction as the input current. The controller 940 may be configured to adjust the size of the feeding unit based on distribution of the magnetic field in the source resonator, to strengthen a portion of the magnetic field with a low strength, or to weaken a portion of the magnetic field with a high strength, so that the magnetic field may be uniformly distributed. This is because the controller 940 may enable strength of the total magnetic field to increase within the feeding unit, and enable the strength of the magnetic field to decrease in the region 910 between the feeding unit and the source resonator.

When the magnetic field is uniformly distributed in the source resonator, the source resonator may have a constant input impedance value. Due to the constant input impedance value, the wireless power transmitter may prevent the power transmission efficiency from being reduced, and may effectively transmit power to the target device, regardless of a location of the target device on the source resonator.

In addition, a wireless power receiver may also include a target resonator, a feeding unit, and a controller. The controller may control an output impedance of the target resonator, by adjusting the size of the feeding unit. The controller may be configured to match the output impedance of the target resonator to an input impedance of the feeding unit, by adjusting an area of a region between the target resonator and the feeding unit. The output impedance of the target resonator may refer to an impedance viewed in a direction from the target resonator to the source resonator. The input impedance of the feeding unit may refer to an impedance viewed in a direction from the feeding unit to a load.

Figure 10:
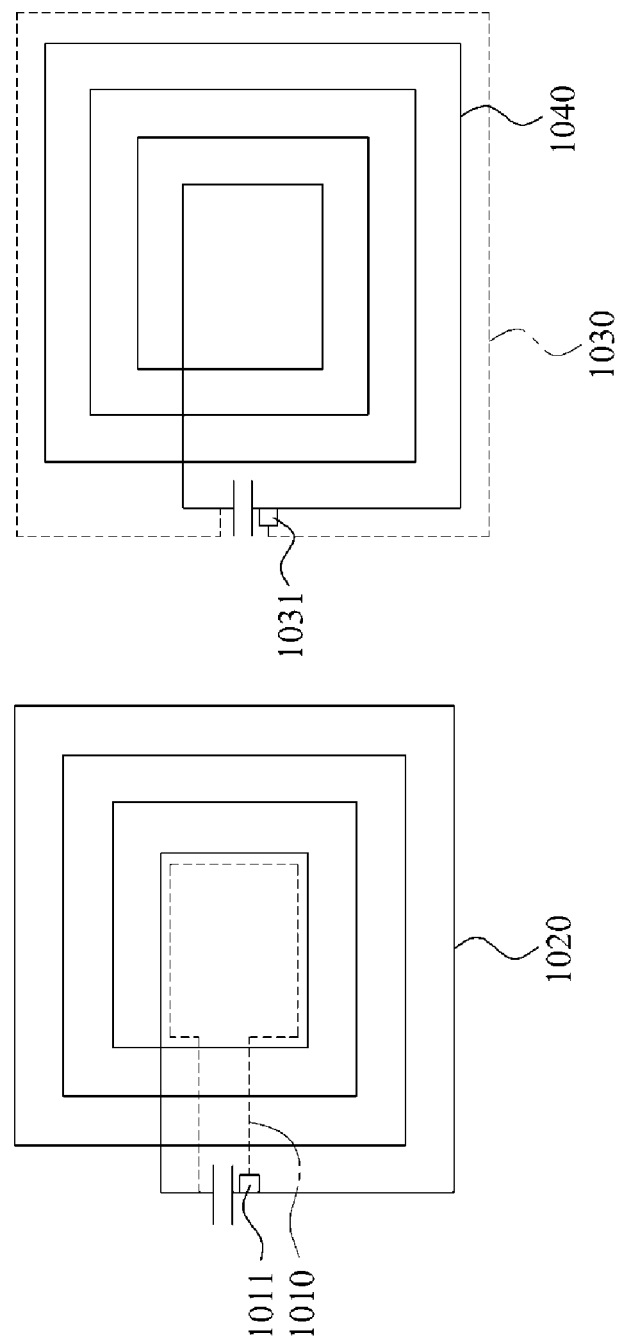
FIG. 10 is a diagram illustrating still another wireless power transmitter.

FIG. 10 illustrates still another wireless power transmitter.

Referring to FIG. 10, source resonators 1020 and 1040 are configured as spiral resonators. The spiral resonators may be formed by winding a coil one or more times in a spiral shape.

In FIG. 10, a feeding unit 1010 may be disposed in the source resonator 1020, in particular, in an innermost turn of the coil wound in the spiral shape. The feeding unit 1010 may include an input port 1011. The input port 1011 may receive an input of an RF signal, and may enable an input current to flow in the feeding unit 1010. The input current may also flow in the source resonator 1020, and may cause a magnetic field to be formed. Additionally, the magnetic field may enable an induced current to be generated in the source resonator 1020 in the same direction as the input current.

One or both of the source resonators 1020 and 1040 may also include a capacitor. The capacitor may be electrically connected between a winding starting end of the coil and a winding finishing end of the coil.

Additionally, a feeding unit 1030 may be disposed around the source resonator 1040, in particular, outside an outermost turn of the coil wound in the spiral shape. The feeding unit 1030 may include an input port 1031. The input port 1031 may receive an input of an RF signal, and may enable an input current to flow in the feeding unit 1030. The input current may also flow in the source resonator 1040, and may cause a magnetic field to be formed. Additionally, the magnetic field may enable an induced current to be generated in the source resonator 1040 in the same direction as the input current.

A source resonator may be, for example, a meta-resonator, a coil resonator, a spiral resonator, a helical resonator, or the like. Additionally, a feeding unit enabling an induced current to be generated in the source resonator may be located within or outside the source resonator. The feeding unit may be electrically connected to both ends of a capacitor included in the source resonator. Portions of the feeding unit that are electrically connected to both ends of the capacitor may not enable an input current to pass directly through the capacitor. The input current may flow through a loop formed by the feeding unit and the source resonator.

FIGS. 11A through 16B illustrate various resonator structures. A source resonator included in a wireless power transmitter, and a target resonator included in a wireless power receiver may be configured as illustrated in FIGS. 11A through 16B.

Figure 11A:
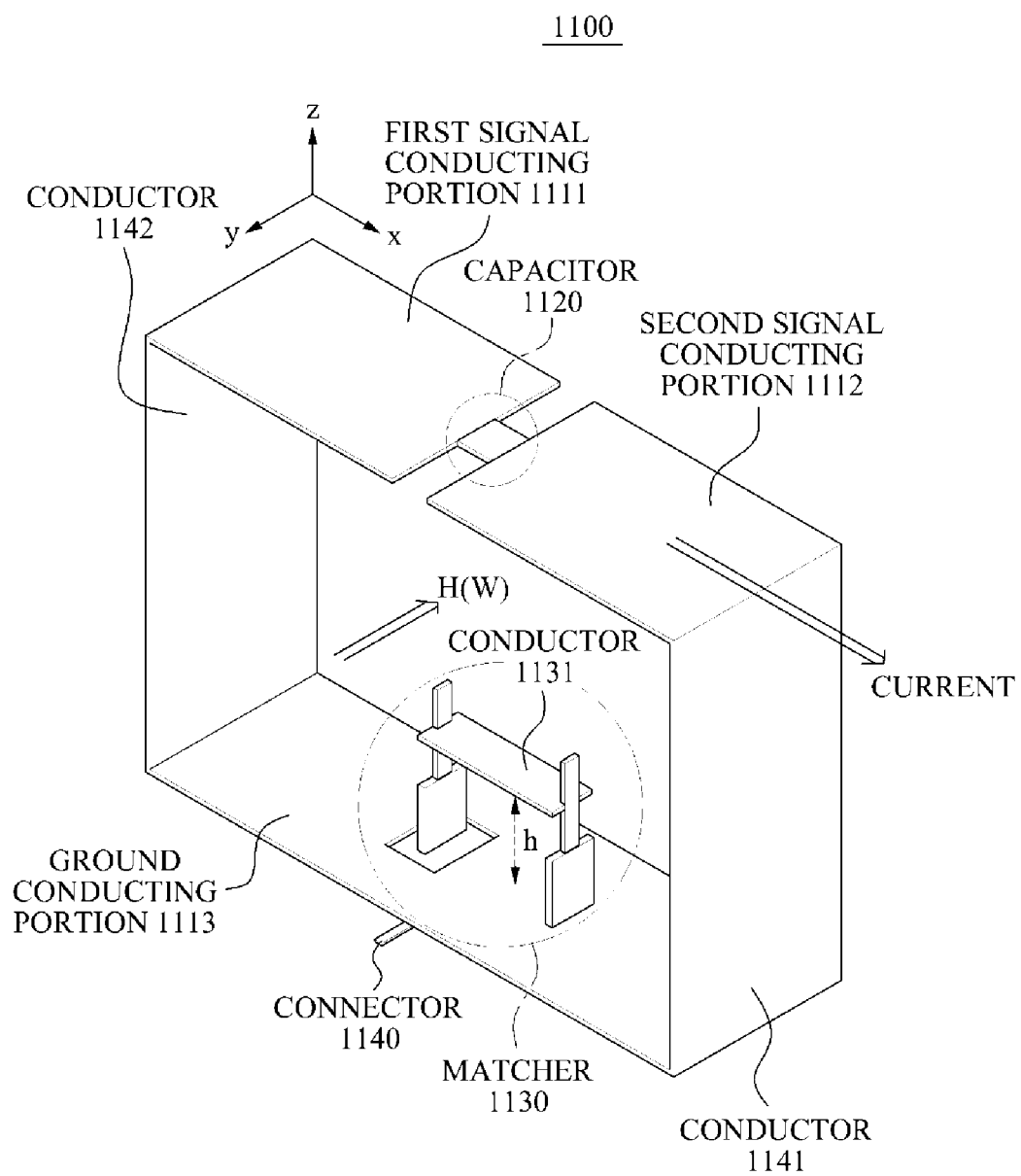
FIG. 11A through FIG. 16B are diagrams illustrating various resonators according to an embodiment.
Figure 11B:
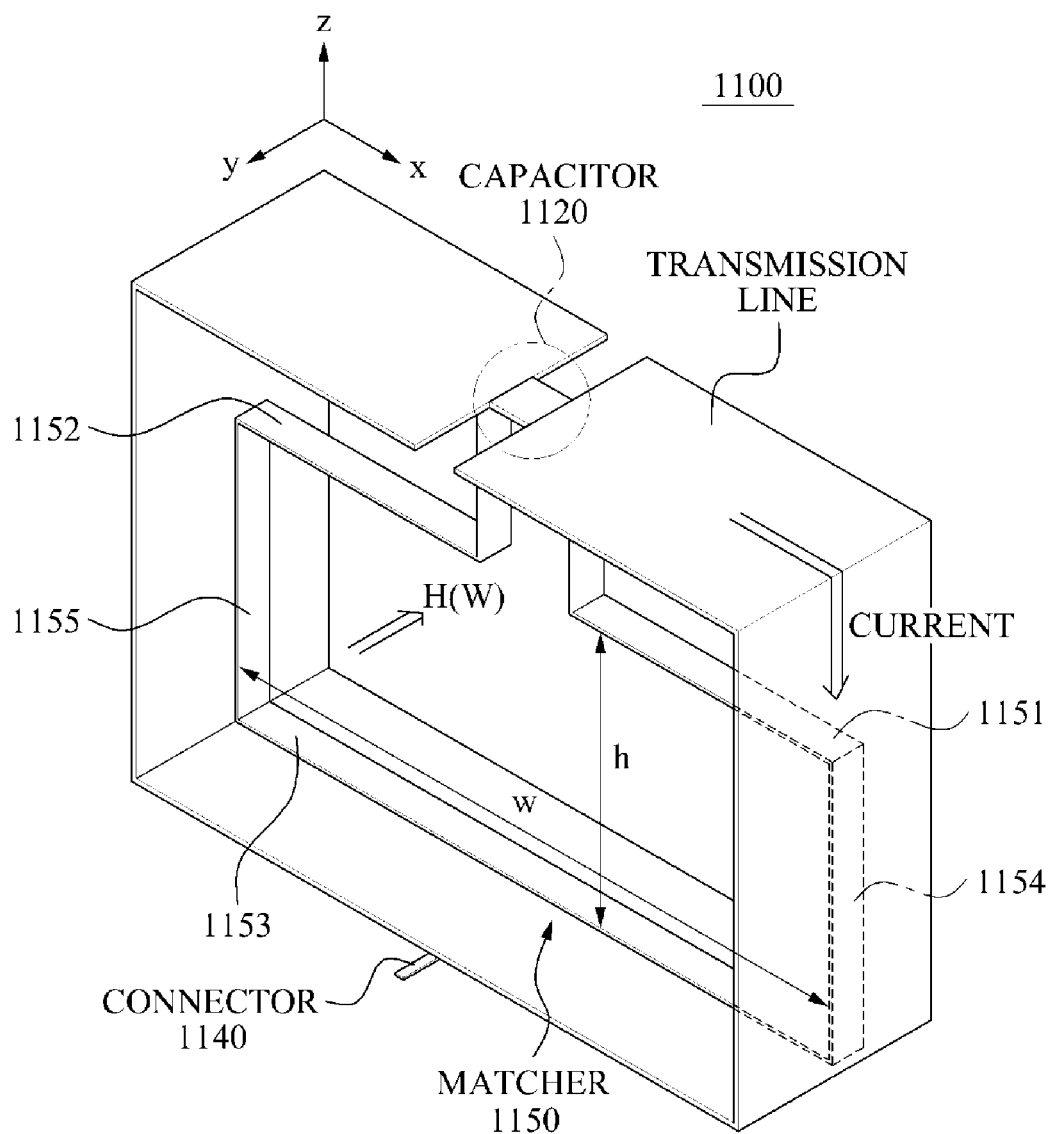

FIGS. 11A and 11B illustrate a resonator having a generally three-dimensional (3D) structure.

Referring to FIG. 11A, a resonator 1100 having the 3D structure may include a transmission line and a capacitor 1120. The transmission line may include a first signal conducting portion 1111, a second signal conducting portion 1112, and a ground conducting portion 1113. The capacitor 1120 may be inserted in series between the first signal conducting portion 1111 and the second signal conducting portion 1112 of the transmission link such that an electric field may be confined within the capacitor 1120.

As illustrated in FIG. 11A, the resonator 1100 may have a generally 3D structure. The transmission line may include the first signal conducting portion 1111 and the second signal conducting portion 1112 in an upper portion of the resonator 1100, and may include the ground conducting portion 1113 in a lower portion of the resonator 1100. The first signal conducting portion 1111 and the second signal conducting portion 1112 may be disposed to face the ground conducting portion 1113. In this arrangement, current may flow in an x direction through the first signal conducting portion 1111 and the second signal conducting portion 1112. Due to the current, a magnetic field H(W) may be formed in a −y direction. Alternatively, the magnetic field H(W) might also be formed in the opposite direction (e.g., a +y direction) in some implementations.

In one or more embodiments, one end of the first signal conducting portion 1111 may be shorted to a conductor 1142, and another end of the first signal conducting portion 1111 may be connected to the capacitor 1120. One end of the second signal conducting portion 1112 may be grounded to a conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, whereby the resonator 1100 may have an electrically closed-loop structure. As illustrated in FIG. 11A, the capacitor 1120 may be inserted or otherwise positioned between the first signal conducting portion 1111 and the second signal conducting portion 1112. The capacitor 1120 may be configured as a lumped element, a distributed element, and the like. In particular, a distributed capacitor configured as a distributed element may include zigzagged conductor lines and a dielectric material having a relatively high permittivity positioned between the zigzagged conductor lines.

When the capacitor 1120 is inserted into the transmission line, the resonator 1100 may have a characteristic of a metamaterial.

The resonator 110 may have the characteristic of the metamaterial, in some instance, due to the capacitance of the capacitor inserted as the lumped element. Since the resonator 1100 may have a negative magnetic permeability by appropriately adjusting the capacitance of the capacitor 1120, the resonator 1100 may also be referred to as an MNG resonator. Various criteria may be applied to determine the capacitance of the capacitor 1120. For example, the various criteria may include one or more of the following: a criterion to enable the resonator 1100 to have the characteristic of the metamaterial, a criterion to enable the resonator 1100 to have a negative magnetic permeability in a target frequency, a criterion to enable the resonator 1100 to have a zeroth order resonance characteristic in the target frequency, or the like. The resonator 1100, also referred to as the MNG resonator 1100, may have a zeroth order resonance characteristic of having, as a resonance frequency, a frequency when a propagation constant is "0". If the resonator 1100 has a zeroth order resonance characteristic, the resonance frequency may be independent with respect to a physical size of the MNG resonator 1100. Thus, by appropriately designing or configuring the capacitor 1120, the MNG resonator 1100 may sufficiently change the resonance frequency without substantially changing the physical size of the MNG resonator 1100.

Referring to the MNG resonator 1100 of FIG. 11A, in a near field, the electric field may be concentrated on the capacitor 1120 inserted into the transmission line. Accordingly, due to the capacitor 1120, the magnetic field may become dominant in the near field. And since the MNG resonator 1100 having the zeroth-order resonance characteristic may have characteristics similar to a magnetic dipole, the magnetic field may become dominant in the near field. A relatively small amount of the electric field formed due to the insertion of the capacitor 1120 may be concentrated on the capacitor 1120 and thus, the magnetic field may become further dominant. The MNG resonator 1100 may have a relatively high Q-factor using the capacitor 1120 of the lumped element and thus, it may be possible to enhance an efficiency of power transmission.

If the MNG resonator 1100 includes a matcher 1130 to be used in impedance matching, the matcher 1130 may be configured to appropriately adjust the strength of the magnetic field of the MNG resonator 1100. An impedance of the MNG resonator 1100 may be determined by the matcher 1130. Current may flow in the MNG resonator 1100 via a connector 1140, or may flow out from the MNG resonator 1100 via the connector 1140. The connector 1140 may be connected to the ground conducting portion 1113 or the matcher 1130.

As illustrated in FIG. 11A, the matcher 1130 may be positioned within the loop formed by the loop structure of the resonator 1100. The matcher 1130 may be configured to adjust the impedance of the resonator 1100 by changing the physical shape of the matcher 1130. For example, the matcher 1130 may include a conductor 1131 to be used in the impedance matching in a location separate from the ground conducting portion 1113 by a distance h. The impedance of the resonator 1100 may be changed by adjusting the distance h.

In one or more embodiments, a controller may be provided to control the matcher 1130. The matcher 1130 may change the physical shape of the matcher 1130 based on a control signal generated by the controller. For example, the distance h between the conductor 1131 of the matcher 1130 and the ground conducting portion 1113 may be increased or decreased based on the control signal. Accordingly, the physical shape of the matcher 1130 may be changed such that the impedance of the resonator 1100 may be adjusted. The distance h between the conductor 1131 of the matcher 1130 and the ground conducting portion 1113 may be adjusted using a variety of schemes. For example, one or more conductors may be included in the matcher 1130 and the distance h may be adjusted by adaptively activating one of the conductors. Alternatively or additionally, the distance h may be adjusted by adjusting the physical location of the conductor 1131 up and down. For instance, the distance h may be controlled based on the control signal of the controller. The controller may generate the control signal using one or more factors.

As illustrated in FIG. 11A, the matcher 1130 may be configured as a passive element such as the conductor 1131. According to various embodiments, the matcher 1130 may be configured as an active element such as, for example, a diode, a transistor, or the like. If an active element is included in the matcher 1130, the active element may be driven based on the control signal generated by the controller, and the impedance of the resonator 1100 may be adjusted based on the control signal. For example, if an active element is a diode included in the matcher 1130, the impedance of the resonator 1100 may be adjusted depending on whether the diode is in an ON state or in an OFF state.

In one or more embodiments, a magnetic core may be further provided to pass through the resonator 1100 configured as the MNG resonator 1100. The magnetic core may increase the power transmission distance.

In some embodiments, the resonator 1100 may include a matcher 1150 for impedance matching, as illustrate in FIG. 11B. The matcher 1150 may include a transmission line, and conductors 1154 and 1155. The transmission line may include a third signal conducting portion 1151, a fourth signal conducting portion 1152, and a ground conducting portion 1153. The conductor 1154 may connect the third signal conducting portion 1151 and the ground conducting portion 1153, and the conductor 1155 may connect the fourth signal conducting portion 1152 and the ground conducting portion 1153. The third signal conducting portion 1151 and the fourth signal conducting portion 1152 may be connected to both ends of the capacitor 1120 of the resonator 1100.

Additionally, one end of the third signal conducting portion 1151 may be shorted to the conductor 1154, and another end of the third signal conducting portion 1151 may be connected to one end of the capacitor 1120. One end of the fourth signal conducting portion 1152 may be shorted to the conductor 1155, and another end of the fourth signal conducting portion 1152 may be connected to another end of the capacitor 1120.

Accordingly, the matcher 1150 and the resonator 1100 may be connected to each other such that the resonator 1100 may have an electrically closed-loop structure. The matcher 1150 may appropriately adjust strength of a magnetic field in the resonator 1100. An impedance of the resonator 1100 may be determined by the matcher 1150. Additionally, current may flow into and/or out of the resonator 1100 via the connector 1140. The connector 1140 may be connected to the matcher 1150. More specifically, the connector 1140 may be connected to the third signal conducting portion 1151 or the fourth signal conducting portion 1152. The current flowing into the resonator 1100 via the connector 1140 may cause an induced current to be generated in the resonator 1100. Accordingly, a direction of a magnetic field formed by the resonator 1100 may be identical to a direction of a magnetic field formed by the matcher 1150 and thus, the strength of the total magnetic field may increase within the matcher 1150. Conversely, a direction of a magnetic field formed by the resonator 1100 may be opposite to a direction of a magnetic field formed by the matcher 1150 and thus, the strength of the total magnetic field may decrease outside the matcher 1150.

The matcher 1150 may be configured to adjust an impedance of the resonator 1100 by changing the physical shape of the matcher 1150. For example, the matcher 1150 may include the third signal conducting portion 1151 and the fourth signal conducting portion 1152 for the impedance matching in a location that is separated from the ground conducting portion 1153 by a distance h. The impedance of the resonator 1100 may be changed by adjusting the distance h.

In one or more embodiments, a controller may be provided to control the matcher 1150. For example, the matcher 1150 may change the physical shape of the matcher 1150 based on a control signal generated by the controller. For example, the distance h between the ground conducting portion 1153, and the third signal conducting portion 1151 and the fourth signal conducting portion 1152 of the matcher 1150 may increase or decrease based on the control signal. Accordingly, the physical shape of the matcher 1150 may be changed, and the impedance of the resonator 1100 may be adjusted. The distance h between the ground conducting portion 1153, and the third signal conducting portion 1151 and the fourth signal conducting portion 1152 of the matcher 1150 may be adjusted using a variety of schemes. In some instances, one or more conductors may be included in the matcher 1150 and the distance h may be adjusted by adaptively activating one of the conductors. Also, the distance h may be adjusted by adjusting the physical locations of the third signal conducting portion 1151 and the fourth signal conducting portion 1152 up and down. The distance h may be controlled based on the control signal of the controller. The controller may generate the control signal using various factors. Additionally, a distance w between the conductors 1154 and 1155 of the matcher 1150 may increase or decrease based on the control signal. Accordingly, the physical shape of the matcher 1150 may be changed and the impedance of the resonator 1100 may be adjusted.

Figure 12A:
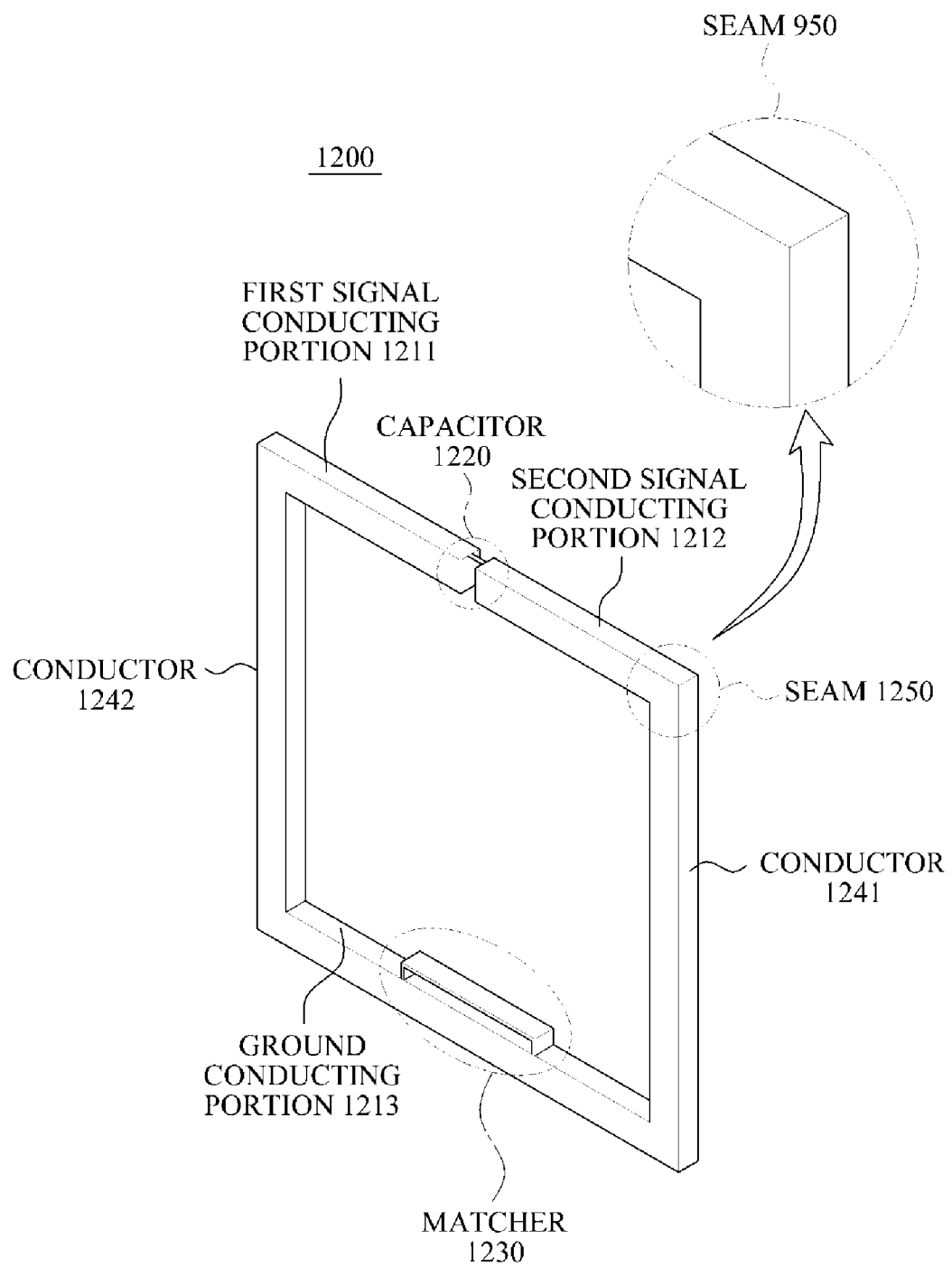
Figure 12B:
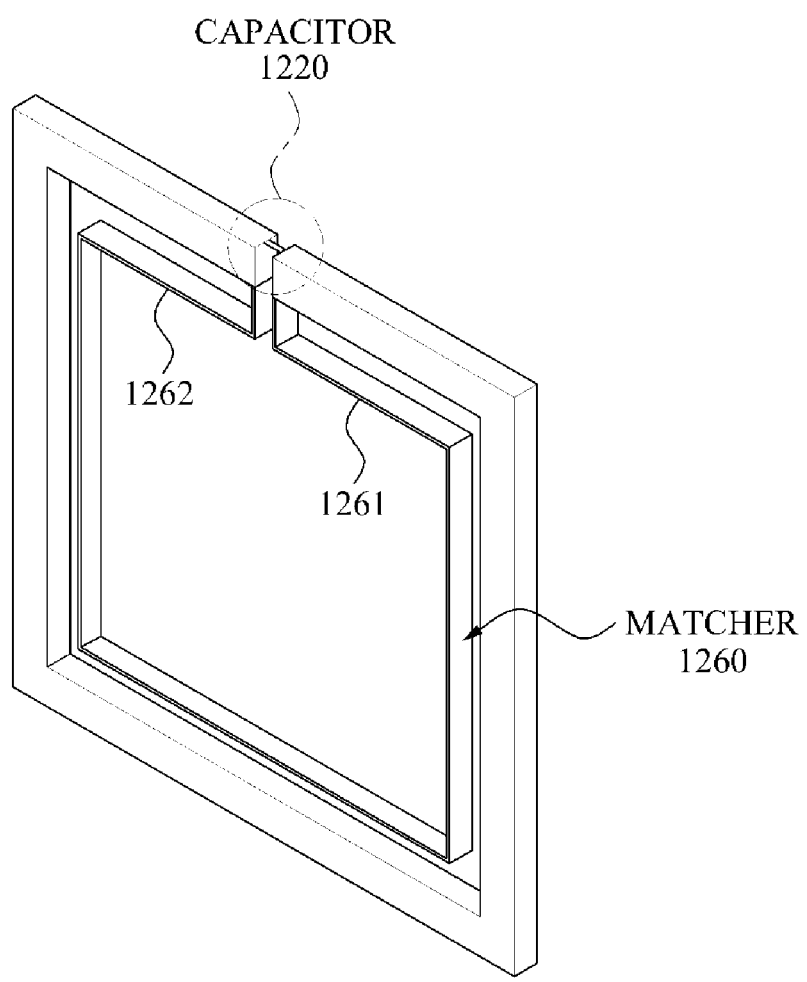

FIGS. 12A and 12B illustrate a bulky-type resonator for wireless power transmission. As used herein, the term "bulky type" may refer to a seamless connection connecting at least two parts in an integrated form.

Referring to FIG. 12A, a first signal conducting portion 1211 and a conductor 1242 may be integrally formed, rather than being separately manufactured and being connected to each other. Similarly, a second signal conducting portion 1212 and a conductor 1241 may also be integrally manufactured.

If the second signal conducting portion 1212 and the conductor 1241 are separately manufactured and then are connected to each other, a loss of conduction may occur due to a seam 1250. Thus, in some implementations, the second signal conducting portion 1212 and the conductor 1241 may be connected to each other without using a separate seam (i.e., seamlessly connected to each other). Additionally, the conductor 1241 and a ground conducting portion 1213 may be seamlessly connected to each other. Accordingly, it may be possible to decrease conductor loss caused by the seam 1250. For instance, the second signal conducting portion 1212 and the ground conducting portion 1213 may be seamlessly and integrally manufactured. Similarly, the first signal conducting portion 1211 and the ground conducting portion 1213 may be seamlessly and integrally manufactured.

As illustrated in FIG. 12A, a resonator 1200 may include a matcher 1230. Or, as illustrated in FIG. 12B, the resonator 1200 may include a matcher 1260, in which conduction portions 1261 and 1262 of the matcher 1260 may be connected to the capacitor 1220.

Figure 13A:
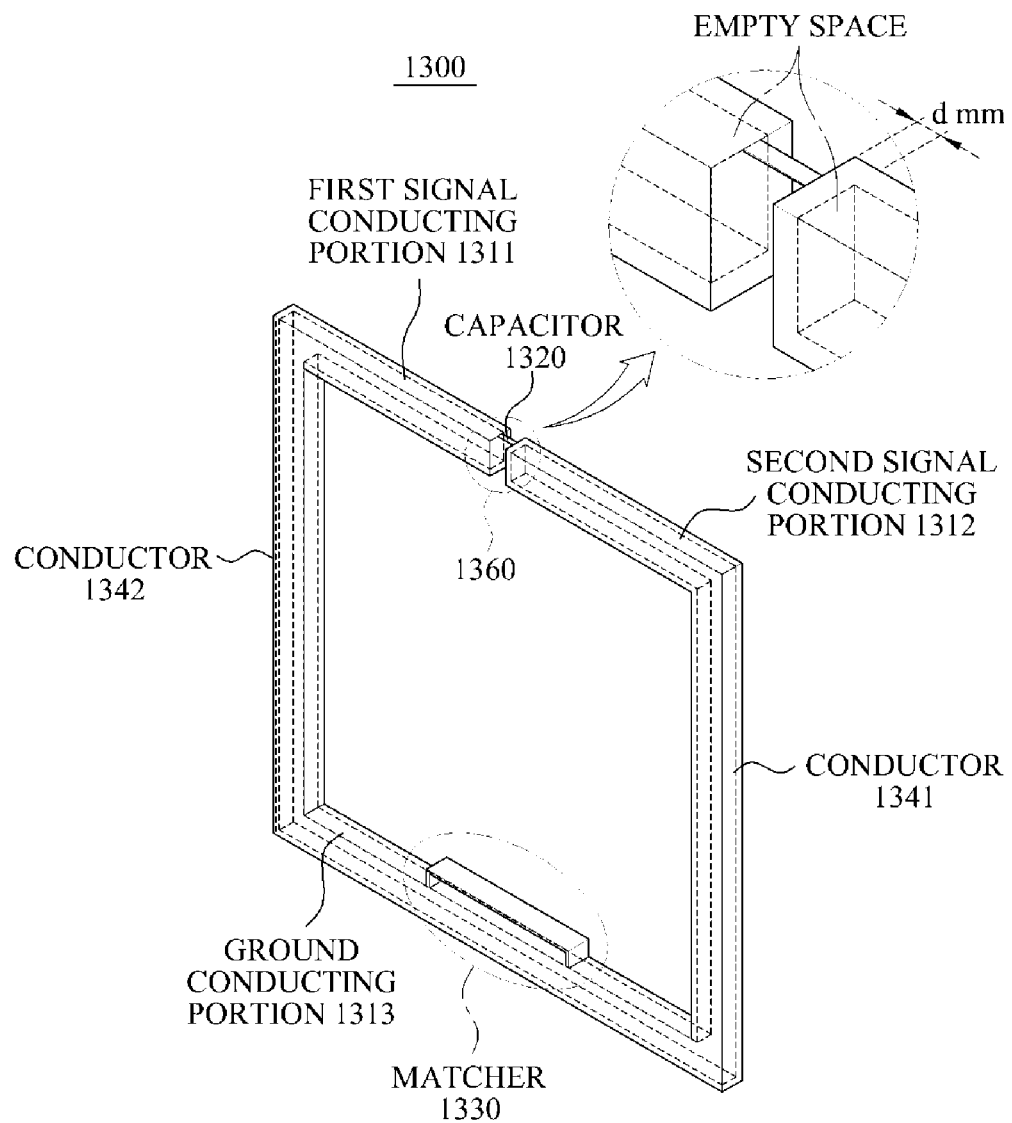
Figure 13B:
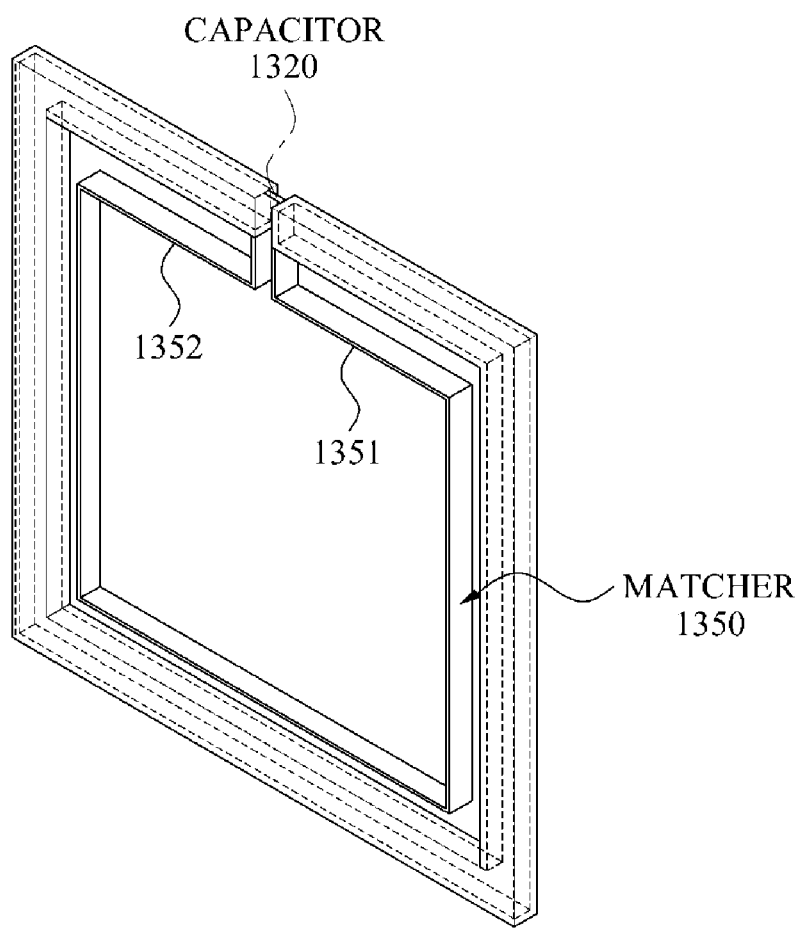

FIGS. 13A and 13B illustrate a hollow-type resonator for wireless power transmission.

Referring to FIG. 13A, one or more of a first signal conducting portion 1311, a second signal conducting portion 1312, a ground conducting portion 1313, and conductors 1341 and 1342 of a resonator 1300 may be configured as the hollow type structure. As used herein the term "hollow type" refers to a configuration that may include an empty space inside.

For a predetermined resonance frequency, an active current may be modeled to flow in only a portion of the first signal conducting portion 1311 instead of the entire first signal conducting portion 1311, may be modeled to flow in only a portion of the second signal conducting portion 1312 instead of the entire second signal conducting portion 1312, may be modeled to flow in only a portion of the ground conducting portion 1313 instead of the entire ground conducting portion 1313, and/or may be modeled to flow in only a portion of the conductors 1341 and 1342 instead of the entire conductors 1341 and 1342. When a depth of one or more of the first signal conducting portion 1311, the second signal conducting portion 1312, the ground conducting portion 1313, and the conductors 1341 and 1342 is significantly deeper than a corresponding skin depth in the predetermined resonance frequency, that depth may be ineffective. As a result, the significantly deeper depth may increase the weight and/or manufacturing costs of the resonator 1300 in some instances.

Accordingly, for the predetermined resonance frequency, the depth of one or more of the first signal conducting portion 1311, the second signal conducting portion 1312, the ground conducting portion 1313, and the conductors 1341 and 1342 may be appropriately determined based on the corresponding skin depth of one or more the first signal conducting portion 1311, the second signal conducting portion 1312, the ground conducting portion 1313, and the conductors 1341 and 1342. If one or more of the first signal conducting portion 1311, the second signal conducting portion 1312, the ground conducting portion 1313, and the conductors 1341 and 1342 have an appropriate depth deeper than a corresponding skin depth, the resonator 1300 may be manufactured to be lighter in weight, and manufacturing costs of the resonator 1300 may also decrease.

For example, as illustrated in FIG. 13A, the depth of the second signal conducting portion 1312 may be determined as "d" mm, and d may be determined according to $$d = \frac{1}{\sqrt{\pi f \mu \sigma}}.$$

In this example, f denotes a frequency, $\mu$ denotes a magnetic permeability, and $\sigma$ denotes a conductor constant. For example, when the first signal conducting portion 1311, the second signal conducting portion 1312, the ground conducting portion 1313, and the conductors 1341 and 1342 are made of copper and have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

As illustrated in FIG. 13A, the resonator 1300 may include a matcher 1330. Or, as illustrated in FIG. 13B, the resonator 1300 may include a matcher 1350, in which conduction portions 1351 and 1352 of the matcher 1350 may be connected to the capacitor 1320.

Figure 14A:
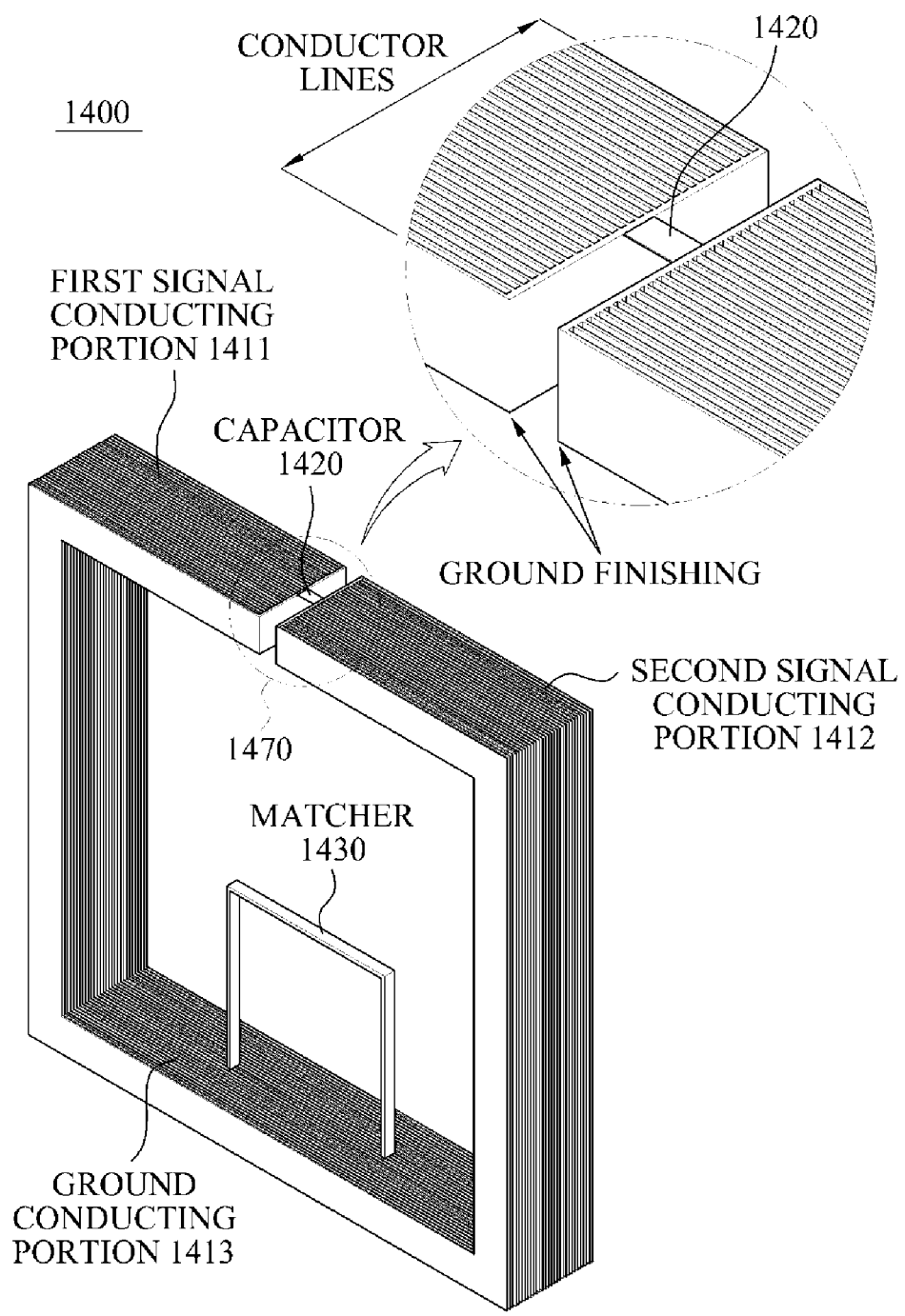
Figure 14B:
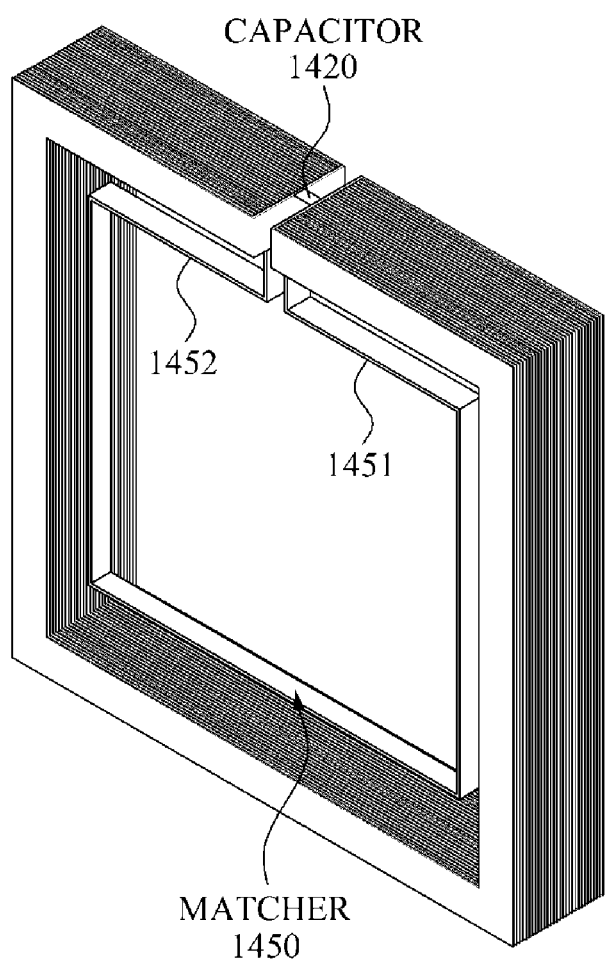

FIGS. 14A and 14B illustrate a resonator for wireless power transmission using a parallel-sheet configuration.

Referring to FIG. 14A, the parallel-sheet configuration may be applicable to one or both of a first signal conducting portion 1411 and a second signal conducting portion 1412 included in a resonator 1400.

The first signal conducting portion 1411 and/or the second signal conducting portion 1412 may not be perfect conductors, and thus may have an inherent resistance. Due to this inherent resistance, an ohmic loss may occur. The ohmic loss may decrease a Q-factor and may also decrease a coupling effect.

By applying the parallel-sheet configuration to each of the first signal conducting portion 1411 and the second signal conducting portion 1412, it may be possible to decrease the ohmic loss, and to increase the Q-factor and the coupling effect. Referring to the enlarged view portion 1470 indicated by a circle in FIG. 14A, in an example in which the parallel-sheet configuration is applied, one or both of the first signal conducting portion 1411 and the second signal conducting portion 1412 may include a plurality of conductor lines. The plurality of conductor lines may be disposed in parallel, and may be electrically connected (i.e., shorted) at an end portion of each of the first signal conducting portion 1411 and the second signal conducting portion 1412.

As described above, when the parallel-sheet configuration is applied to the first signal conducting portion 1411 and the second signal conducting portion 1412, the plurality of conductor lines may be disposed in parallel. Accordingly, the sum of resistances of the conductor lines may decrease. Consequently, the resistance loss may decrease, and the Q-factor and the coupling effect may increase.

As illustrated in FIG. 14A, the resonator 1400 may include a matcher 1430. Or, as illustrated in FIG. 14B, the resonator 1400 may include a matcher 1450, in which conduction portions 1451 and 1452 of the matcher 1450 may be connected to the capacitor 1420.

Figure 15A:
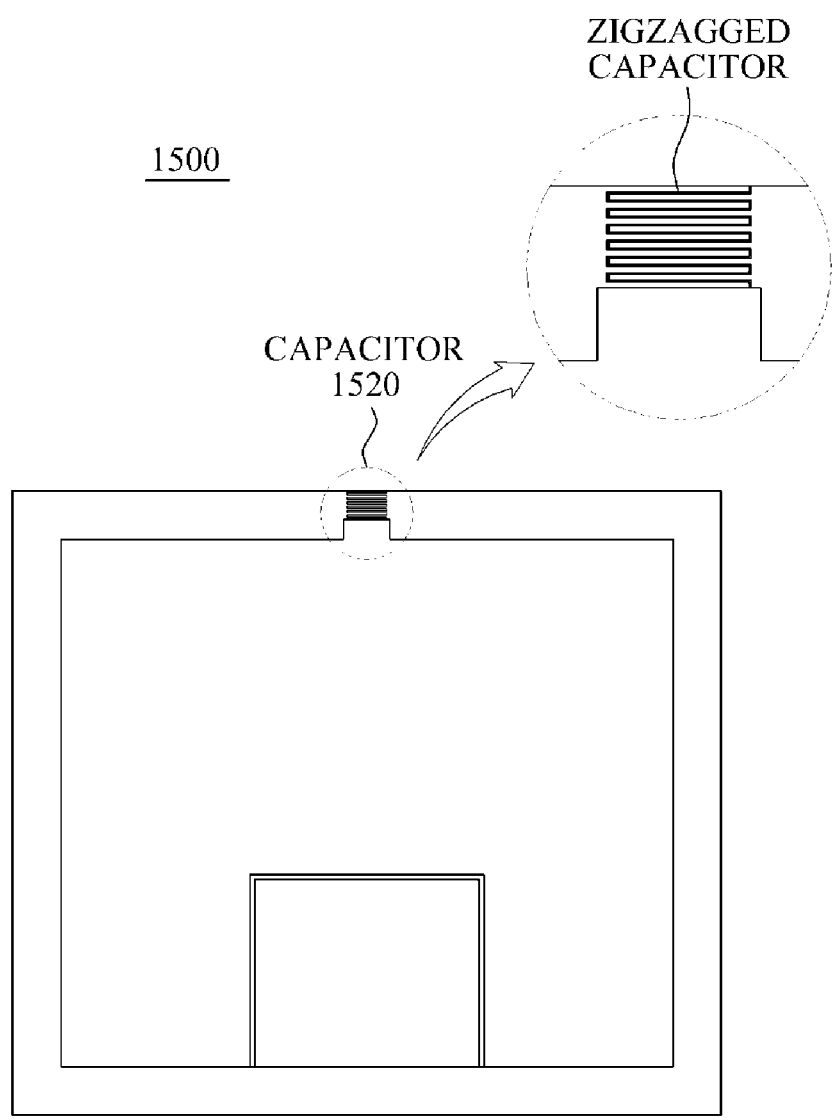
Figure 15B:
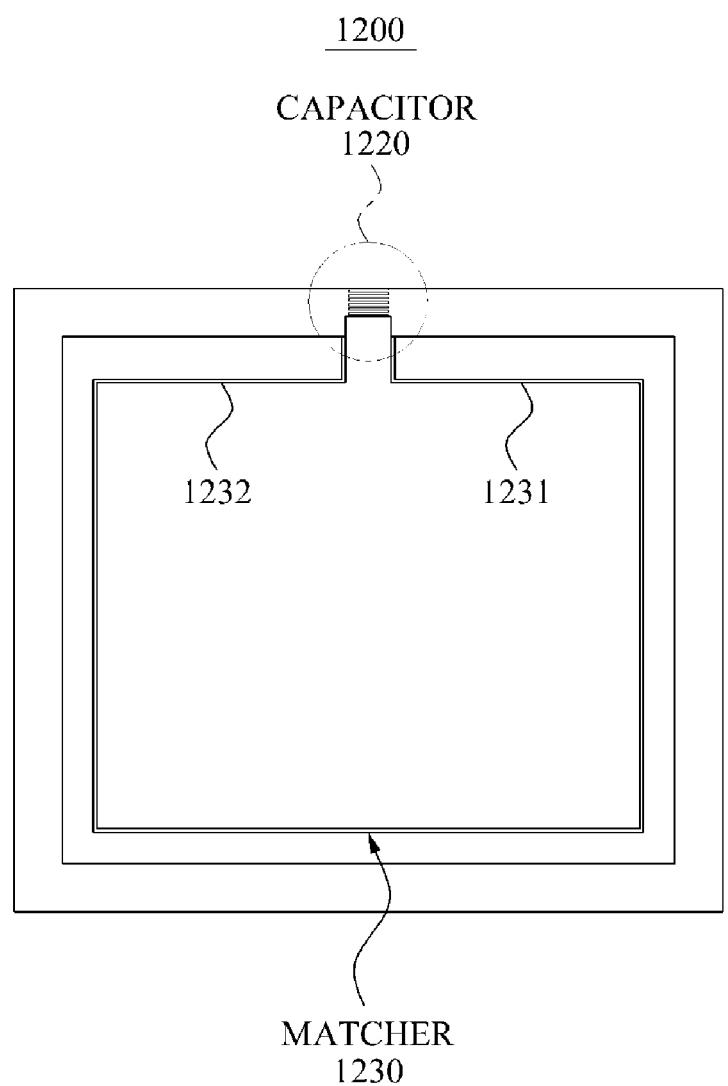

FIGS. 15A and 15B illustrate a resonator for wireless power transmission including a distributed capacitor.

Referring to FIG. 15A, a capacitor 1520 included in a resonator 1500 for the wireless power transmission may be a distributed capacitor. A capacitor used as a lumped element may have a relatively high equivalent series resistance (ESR). A variety of schemes have been proposed to decrease the ESR contained in the capacitor of the lumped element. According to an embodiment, by using the capacitor 1520 as a distributed element, it may be possible to decrease the ESR. As will be appreciated, a loss caused by the ESR may decrease a Q-factor and a coupling effect.

As illustrated in FIG. 15A, the capacitor 1520 as the distributed element may have a zigzagged structure. For example, the capacitor 1520 as the distributed element may be configured with a zigzagged conductive line and a dielectric material.

By employing the capacitor 1520 as the distributed element, it may be possible to decrease the loss occurring due to the ESR. In addition, by disposing, in parallel, a plurality of capacitors as lumped elements, it may be possible to decrease the loss occurring due to the ESR. Since the resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF each instead of using a single capacitor of 10 pF, it may be possible to decrease the loss occurring due to the ESR.

As illustrated in FIG. 15B, the resonator 1500 may include a matcher 1530 in which conduction portions 1531 and 1532 of the matcher 1530 may be connected to the capacitor 1520.

Figure 16A:
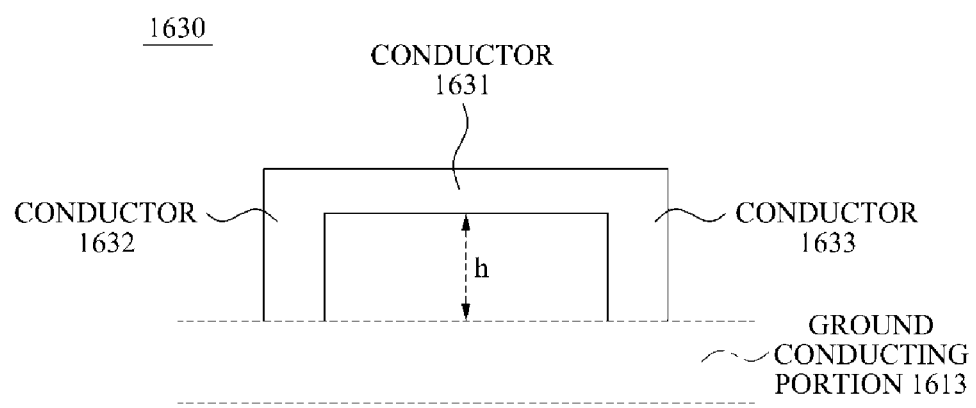
Figure 16B:
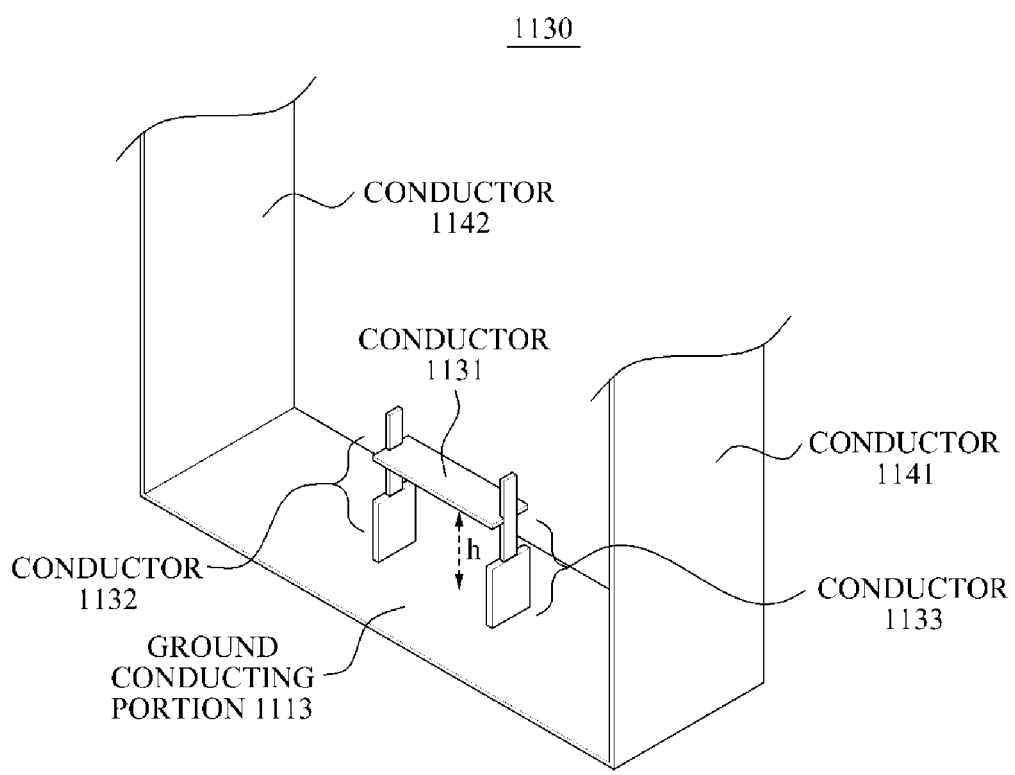

FIG. 16A illustrates a matcher used in a resonator having a 2D structure, and FIG. 16B illustrates a matcher used in a resonator having a 3D structure.

More specifically, FIG. 16A illustrates a portion of a resonator 1600 including a matcher 1630, and FIG. 16B illustrates a portion of the resonator 1100 of FIG. 11A including the matcher 1130.

Referring to FIG. 16A, the matcher 1630 includes a conductor 1631, a conductor 1632, and a conductor 1633. The conductors 1632 and 1633 may be connected to the conductor 1631, and to a first ground conducting portion 1613 of a transmission line. The matcher 1630 may correspond to the feeder 660 of FIG. 6B. The impedance of the 2D resonator may be determined based on a distance h between the conductor 1631 and the first ground conducting portion 1613. The distance h between the conductor 1631 and the first ground conducting portion 1613 may be controlled by a controller. The distance h between the conductor 1631 and the first ground conducting portion 1613 may be adjusted using a variety of schemes. For example, the variety of schemes may include a scheme of adjusting the distance h by adaptively activating one of the conductors 1631, 1632, and 1633, a scheme of adjusting the physical location of the conductor 1631 up and down, and the like.

Referring to FIG. 16B, the matcher 1130 includes the conductor 1131, a conductor 1132, and a conductor 1133. The conductors 1132 and 1133 may be connected to the ground conducting portion 1113 and the conductor 1131. The impedance of the 3D resonator may be determined based on a distance h between the conductor 1131 and the ground conducting portion 1113. The distance h between the conductor 1131 and the ground conducting portion 1113 may be controlled by the controller. Similar to the matcher 1630 of FIG. 16A, in the matcher 1130, the distance h between the conductor 1131 and the ground conducting portion 1113 may be adjusted using a variety of schemes. For example, the variety of schemes may include a scheme of adjusting the distance h by adaptively activating one of the conductors 1131, 1132, and 1133, a scheme of adjusting the physical location of the conductor 1131 up and down, and the like.

In one or more embodiments, the matcher may include an active element. A scheme of adjusting an impedance of a resonator using the active element may be similar to the examples described above. For example, the impedance of the resonator may be adjusted by changing a path of a current flowing through the matcher using the active element.

Figure 17:
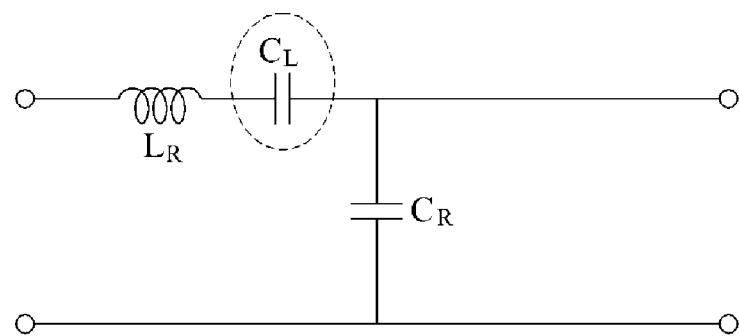
FIG. 17 is a diagram illustrating one equivalent circuit of a resonator of FIG. 11A.

FIG. 17 illustrates one equivalent circuit of the resonator 1100 of FIG. 11A.

The resonator 1100 used in a wireless power transmission may be modeled to the equivalent circuit of FIG. 17. In the equivalent circuit depicted in FIG. 17, $L_R$ denotes an inductance of the power transmission line, $C_L$ denotes a capacitor that is inserted in a form of a lumped element in the middle of the power transmission line, and $C_R$ denotes a capacitance between the power transmission lines and/or ground of FIG. 11A.

In some instances, the resonator 1100 may have a zeroth resonance characteristic. For example, when a propagation constant is "0", the resonator 1100 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \quad \text{[Equation 1]}$$

In Equation 1, MZR denotes a Mu zero resonator.

Referring to Equation 1, the resonance frequency $\omega_{MZR}$ of the resonator 1100 may be determined by $L_R/C_L$. The physical size of the resonator 1100 and the resonance frequency $\omega_{MZR}$ may be independent with respect to each other. Since the physical sizes are independent with respect to each other, the physical size of the resonator 1100 may be sufficiently reduced.

The units and other elements described herein may be implemented using hardware components, software components, or a combination thereof, in some embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In to addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A source device that distributes a wireless power in a wireless power transmission system, the source device comprising:
   a matching circuit searching unit configured to determine information associated with a matching circuit of a source device based on one or more target devices and the amount of power to be distributed to the one or more of the target devices; and
   a matching circuit modifying unit configured to modify the shape of the matching circuit of the source device to correspond to the determined information associated with the matching circuit of the source device.

2. The source device of claim 1, further comprising:
   a target determining unit configured to determine the number of target devices, and respective states of the target devices; and
   a distribution determining unit configured to determine the amount of power to be distributed to the one or more target devices based on the number of target devices and the respective states of the target devices.

3. The source device of claim 2, wherein the state of the target device comprises: a type of a device, an amount of power required, an amount of charged power, or any combination thereof.

4. The source device of claim 1, wherein the matching circuit searching unit determines the information associated with the matching circuit using a table including a shape of a matching circuit of the source device, one or more shapes of a target device and one or more amounts of power to be distributed to a target device.

5. The source device of claim 2, wherein the matching circuit searching unit determines shapes of matching circuits of target devices that correspond to the number of target devices and the amount of power to be distributed to the one or more target devices, and transmits, to the one or more target devices, information associated with a corresponding shape of a matching circuit.

6. The source device of claim 2, wherein the target determining unit determines the number of target devices by receiving requests for supplying of power through communication with the target devices, by utilizing a sensor configured to sense a target device, or based on a resonance characteristic for supplying of the wireless power.

7. The source device of claim 1, wherein:
   the matching circuit comprises a switch or a variable device configured to modify the shape of the matching circuit; and
   the matching circuit modifying unit modifies the switch or the variable device to correspond to the determined information associated with the matching circuit of the source device.

8. A target device to which a wireless power is distributed in a wireless power transmission system, the target device comprising:
   a matching circuit shape receiving unit configured to receive, from a source device, information associated with a shape of a matching circuit of a target device; and
   a matching circuit modifying unit configured to modify the shape of the matching circuit of the target device to correspond to the received information associated with the shape of the matching circuit of the target device.

9. The target device of claim 8, further comprising:
   a requesting unit configured to report a state of the target device to the source device.

10. The target device of claim 9, wherein the requesting unit requests, from the source device, supplying of power.

11. The target device of claim 9, wherein the state of the target device comprises a type of a device, an amount of power required, an amount of charged power, or any combination thereof.

12. The target device of claim 8, wherein:
the matching circuit comprises a switch or a variable device configured to modify the shape of the matching circuit; and
the matching circuit modifying unit modifies the switch or the variable device to correspond to the received information associated with the shape of the matching circuit of the target device.

13. A method of distributing a wireless power in a source device in a wireless power transmission system, the method comprising:
determining a shape of a matching circuit of the source device based on one or more target devices and the amount of power to be distributed to the one or more target devices; and
modifying the matching circuit of the source device to correspond to the determined shape of the matching circuit of the source device.

14. The method of claim 13, further comprising:
determining the number of target devices;
determining the respective states of the target devices; and
determining the amount of power to be distributed to the one or more target devices based on the number of target devices and respective states of the one or more target devices.

15. The method of claim 13, wherein the state of a target device comprises: a type of a device, an amount of power required, an amount of charged power, or any combination thereof.

16. The method of claim 13, wherein the determining of the shape of the matching circuit of the source device comprises:
determining the shape of the matching circuit of the source device based on a table including a shape of the matching circuit of the source device, one or more shapes of matching circuits of a target device and one or more amounts of power to be distributed to a target device.

17. The method of claim 14, wherein, before the transmitting of the wireless power, the method comprises:
determining shapes of matching circuits of target devices corresponding to the number of target devices and the amount of power to be distributed to the one or more target devices; and
transmitting, to one or more target devices, information associated with a corresponding shape of a matching circuit.

18. The method of claim 14, wherein the determining of the number of target devices comprises:
determining the number of target devices by receiving requests for supplying of power through communication with the target devices, by utilizing a sensor configured to sense a target device, or based on a resonance characteristic for supplying of the wireless power.

19. The method of claim 13, wherein the modifying of the matching circuit comprises:
modifying the matching circuit of the source device to correspond to the determined shape of the matching circuit of the source device using a switch or a variable device included in the matching circuit of the source device.

20. A method of receiving a distributed wireless power in a target device in a wireless power transmission system, the method comprising:
receiving information associated with a shape of a matching circuit of a target device from the source device; and
modifying the matching circuit of the target device to correspond to the received information associated with the shape of the matching circuit of the target device.

21. The method of claim 20, further comprising:
reporting a state of the target device to the source device.

22. The method of claim 21, wherein, before the reporting, the method further comprises:
requesting supplying of power from the source device.

23. The method of claim 21, wherein the state of the target device comprises: a type of a device, an amount of power required, an amount of charged power, or any combination thereof.

24. The method of claim 20, wherein the modifying comprises:
modifying the matching circuit of the target device to correspond to the received information associated with the shape of the matching circuit of the target device, using a switch or a variable device included in the matching circuit of the target device.

25. The method of claim 20, further comprising:
receiving wireless power from the source device.

* * * * *